United States Patent
Manning

(10) Patent No.: US 9,060,385 B1
(45) Date of Patent: Jun. 16, 2015

(54) UNIVERSAL BLUETOOTH/WIRELESS GLOVE

(71) Applicant: Lloyd Douglas Manning, Banner Elk, NC (US)

(72) Inventor: Lloyd Douglas Manning, Banner Elk, NC (US)

(*) Notice: Subject to any disclaimer, the term of this patent is extended or adjusted under 35 U.S.C. 154(b) by 68 days.

(21) Appl. No.: 13/652,424

(22) Filed: Oct. 15, 2012

Related U.S. Application Data

(63) Continuation-in-part of application No. 13/114,028, filed on May 23, 2011, now Pat. No. 8,306,673, and a continuation-in-part of application No. 12/106,323, filed on Apr. 20, 2008, now Pat. No. 8,290,636.

(60) Provisional application No. 61/347,423, filed on May 23, 2010, provisional application No. 60/912,940, filed on Apr. 20, 2007.

(51) Int. Cl.
*H04M 1/00* (2006.01)
*H04W 84/18* (2009.01)

(52) U.S. Cl.
CPC .................................. *H04W 84/18* (2013.01)

(58) Field of Classification Search
USPC ........ 455/41.2, 556.1, 556.2, 557, 91, 92, 95, 455/100; 345/157, 158, 168
See application file for complete search history.

(56) References Cited

U.S. PATENT DOCUMENTS

| 5,381,870 | A | 1/1995 | Kaufman | |
|---|---|---|---|---|
| 6,128,004 | A | * 10/2000 | McDowall et al. | 345/158 |
| 6,141,643 | A | * 10/2000 | Harmon | 704/271 |
| 6,701,296 | B1 | * 3/2004 | Kramer et al. | 704/270 |
| 7,848,850 | B2 | * 12/2010 | Hoshino et al. | 700/264 |
| 8,362,350 | B2 | * 1/2013 | Kockovic | 84/743 |
| 2005/0156895 | A1 | * 7/2005 | Ho | 345/168 |
| 2009/0212979 | A1 | * 8/2009 | Catchings et al. | 341/20 |
| 2010/0234182 | A1 | * 9/2010 | Hoffman et al. | 482/8 |
| 2010/0328205 | A1 | * 12/2010 | Cheng | 345/157 |
| 2011/0004074 | A1 | * 1/2011 | V et al. | 600/301 |
| 2012/0056805 | A1 | * 3/2012 | Bronner et al. | 345/157 |

OTHER PUBLICATIONS

Agilent, "Aglient ADNS-2620 Optical Mouse Sensor", Jun. 17, 2003.
Broadcom, "Single-Chip Bluetooth Mouse and Kebyboard", 2005.
Smart Design, "CSR1000 Bluetooth Modules", May 30, 2012.

* cited by examiner

*Primary Examiner* — Tuan A Tran
(74) *Attorney, Agent, or Firm* — Monty Simmons; Simmons Patents

(57) ABSTRACT

The present invention relates to a universal wireless controller configured to generate control signals for controlling a plurality of devices. Such controller comprises a plurality of stretch sensors and switch sensors associated with at least one glove or similar structure configured for being associated with a users' hand. The controller detects finger and hand movements and generates the appropriate communication signal based on values contained in a configuration table. The same wireless controller can control a plurality of devices without the need for reprogramming or mode selections.

20 Claims, 16 Drawing Sheets

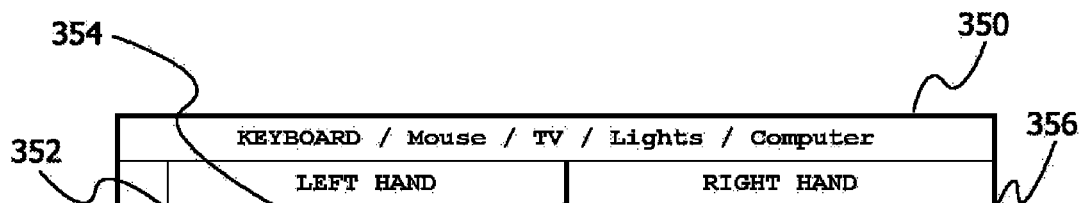

| # | Trigger Event | Programmed Function | EMUL ID | Trigger Event | Programmed Function | EMUL ID |
|---|---|---|---|---|---|---|
| | LEFT HAND | | | RIGHT HAND | | |
| 1 | K1 Pressed | Function Key Channel Up | 0020 | K1 Pressed | Function Key Open Browser | 0001 |
| 2 | K2 Pressed | Function Key Channel Down | 0020 | K2 Pressed | Function Key Open WP | 0001 |
| 3 | K3 Pressed | Function Key Cycle Power | 0020 | K3 Pressed | Function Key Open e-Mail | 0001 |
| 4 | K4 Pressed | Function Key Cycle Lights | 0100 | K4 Pressed | Function Key Power Down | 0001 |
| 5 | TA | Not Defined | 0000 | TA | Not Defined | 0000 |
| 6 | TA-F1A | User Definable | 0001 | TA-F1A | User Definable | 0001 |
| 7 | TA-F2A-1x | A | 0001 | TA-F2A-1x | N | 0001 |
| 8 | TA-F2A-2x | B | 0001 | TA-F2A-2x | O | 0001 |
| 9 | TA-F2A-3x | C | 0001 | TA-F2A-3x | P | 0001 |
| 10 | TA-F2B-1x | D | 0001 | TA-F2B-1x | Q | 0001 |
| 11 | TA-F2B-2x | E | 0001 | TA-F2B-2x | R | 0001 |
| 12 | TA-F2B-3x | F | 0001 | TA-F2B-3x | S | 0001 |
| 13 | TA-F3A-1x | G | 0001 | TA-F3A-1x | T | 0001 |
| 14 | TA-F3A-2x | H | 0001 | TA-F3A-2x | U | 0001 |
| 15 | TA-F3A-3x | I | 0001 | TA-F3A-3x | V | 0001 |
| 16 | TA-F3B-1x | J | 0001 | TA-F3B-1x | W | 0001 |
| 17 | TA-F3B-2x | K | 0001 | TA-F3B-2x | X | 0001 |
| 18 | TA-F3B-3x | L | 0001 | TA-F3B-3x | Y | 0001 |
| 19 | TA-F3B-4x | M | 0001 | TA-F3B-2x | Z | 0001 |
| 20 | TA-F4A | Enter | 0001 | F4A | Mouse Sensor Movement | 0001 |
| 21 | TA-F4B | Left Mouse Click | 0001 | TA-F4B | Right Mouse Click | 0001 |
| 22 | TA-F4C | Back Space | 0001 | TA-F4C | Delete | 0001 |

TABLE 1

MOTIONS

| # | ID | LEFT HAND | | | ID | RIGHT HAND | | |
|---|---|---|---|---|---|---|---|---|
| | | Trigger Event | Programmed Function | EMUL ID | | Trigger Event | Programmed Function | EMUL ID |
| 1 | TS | Thumb Motion | Thumb Motion ---- | 0001 | TS | Thumb Motion | Thumb Motion ---- | 0000 |
| 2 | WS | stretching shrinking | Wrist Movement ---- | 0001 | WS | stretching shrinking | Wrist Move ---- | 0000 |
| 3 | F4S | stretching shrinking | Index Finger ---- | 0000 | F4S | stretching shrinking | Index Finger throttle up/down | 1000 |
| 4 | F3S | stretching shrinking | Middle Finger ---- | 0000 | F3S | stretching shrinking | Middle Finger ---- | 0000 |
| 5 | F2S | stretching shrinking | Ring Finger ---- | 0000 | F2S | stretching shrinking | Ring Finger ---- | 0000 |
| 6 | F1S | stretching shrinking | Pinky Movement ---- | 0000 | F1S | stretching shrinking | Pinky Apply Brake | 1000 |
| 6 | F1A | F1A-PA | Pinky Curl Mute | 0020 | F1A | F1A-PA | Pinky Curl Full brake | 1000 |
| 7 | F2A | F2A-PA | Ring Finger volume up | 0020 | F2A | F2A-PA | Ring Finger ---- | 0000 |
| 9 | F3A | F2A-PA | Middle Finger Volume Down | 0020 | F3A | F2A-PA | Middle Finger Cycle Security System | 0100 |
| 10 | F3A | F2A-PA | Index Finger ---- | 0000 | F3A | F2A-PA | Index Finger Lock Doors | 0100 |

TABLE 2

UNIVERSAL BLUETOOTH/WIRELESS GLOVE

CLAIM TO PRIORITY

This application is a continuation in part to application Ser. No. 12/106,323, filed 20 Apr. 2008, (to issue as U.S. Pat. No. 8,290,636), which claims priority to provisional application 60/912,940, filed on 20 Apr. 2007, and is further a continuation in part to application Ser. No. 13/114,028, filed on 23 May 2010 which claims priority to provisional application 61/347,423, filed on 23 May 2010, whereas the entire contents of all such references are hereby incorporated herein by this reference for all that they disclose for all purposes.

TECHNICAL FIELD OF THE INVENTION

The present invention relates to a universal control system for wireless control and communication with electronic devices including: a riding apparatus booster system, a lighting system, an anti-theft system, an entertainment system, a recording system, sensor systems and communication system.

BACKGROUND OF THE INVENTION

Many new powered riding devices designed to be ridden while standing have been developed in recent years. Such devices included water vehicles such as powered surfboards or water boards, and land vehicles such as powered skate boards, longboards (essentially a surfboard on wheels), off-road "all terrain" boards. Such devices are designed to provide, as far as possible, the same experience of riding an unpowered version of such devices. These devices can be shaped in various different ways and configured with any number of propulsion systems and other systems such as lights, entertainment, and recording systems.

While many prior art powered riding devices work well and are entertaining to operate, all such systems have a common drawback: the control system. As noted above, for unpowered systems, there is no "control" tether associating the device operator to the machine/device. However, for most prior art powered machines, the control system used to control the operation of the propulsion systems comprise a controller held by an operator wherein such controller is tethered to the propulsion systems. Thus, the control system basically tethers the user to the powered machine. While such machines may be fun to ride and operate, the control tether takes away for the "feel" of the original unpowered experience.

Some system are said to have "wireless" hand held controllers that use an RF signal to send control signals form the operator to the power device. However, such systems are said to be unreliable and using a handheld controller still takes away from the "feel" of the original unpowered experience. Additionally, such prior art control systems provide little or no information to the user.

What is needed is an electronic module based control system configured to control the systems of a powered machine, including the propulsion system, where such electronic module is associated with a user in a way that better approximates the "feel" of an unpowered version of such powered machine. Further, such a controller should use a reliable wireless communication association with the powered machine and would preferably provide a plurality of information such as at least one of the following: location data for locating the device, emergency information, board status, fuel status, and environmental warnings. The controller would ideally also provided universal control functionally for a plurality of subsystems such as display technology, booster system control, propulsion system control, lighting system control, repellant system control, anti-theft system control, entertainment system control, recording system control, safety system control, and communication system control. Such controller should also be configurable and/or programmable to provide a control/communication function for any number of electronic devices.

SUMMARY

Some of the objects and advantages of the invention will now be set forth in the following description, while other objects and advantages of the invention may be obvious from the description, or may be learned through practice of the invention.

Broadly speaking, a principle object of the present invention is to provide a universal wireless controller that can be programmed for communication and/or control of any suitably configured electronic device.

Yet another principle object of the present invention is to provide a universal wireless controller that is associated with a user's hand and controlled by hand/finger movements.

Anther general object of the present invention is to provide a wireless controller for the propulsion systems of powered riding devices.

Another object of the present invention is to provide a wireless controller for the propulsion systems of powered riding devices where a user stands on the powered riding device and wherein said controller is associated with at least one hand of said user.

Yet another object of the invention is to provide a universal wireless controller configured for being associated with a user's hand and controlled by hand/finger movements wherein said controller is programmable to communicate with and/or control a plurality of electronic devices including computing devices and communication devices.

Still another object of the invention is to provide a wireless controller for the propulsion systems of powered riding device wherein said controller is further configured to control other systems including: location systems for locating such controller (and a user associated with such controller) and the powered riding device electrically associated with the controller, emergency information system, environmental warning system, display technology, booster system, a lighting system, a repellant system, an anti-theft system, an entertainment system, a recording system, safety system, and a communication system.

Additional objects and advantages of the present invention are set forth in the detailed description herein or will be apparent to those skilled in the art upon reviewing the detailed description. Also, it should be further appreciated that modifications and variations to the specifically illustrated, referenced, and discussed steps, or features hereof may be practiced in various uses and embodiments of this invention without departing from the spirit and scope thereof, by virtue of the present reference thereto. Such variations may include, but are not limited to, substitution of equivalent steps, referenced or discussed, and the functional, operational, or positional reversal of various features, steps, parts, or the like. Still further, it is to be understood that different embodiments, as well as different presently preferred embodiments, of this invention may include various combinations or configurations of presently disclosed features or elements, or their equivalents (including combinations of features or parts or configurations thereof not expressly shown in the figures or stated in the detailed description).

Those of ordinary skill in the art will better appreciate the features and aspects of such embodiments, and others, upon review of the remainder of the specification.

BRIEF DESCRIPTION OF THE DRAWINGS

A full and enabling description of the present subject matter, including the best mode thereof, directed to one of ordinary skill in the art, is set forth in the specification, which makes reference to the appended figures, in which:

FIG. 13 is a one embodiment of controller-configuration-table for an exemplary electronic device to be controlled; and FIG. 14 is a continuation of the table presented in FIG. 13.

Figure 1:
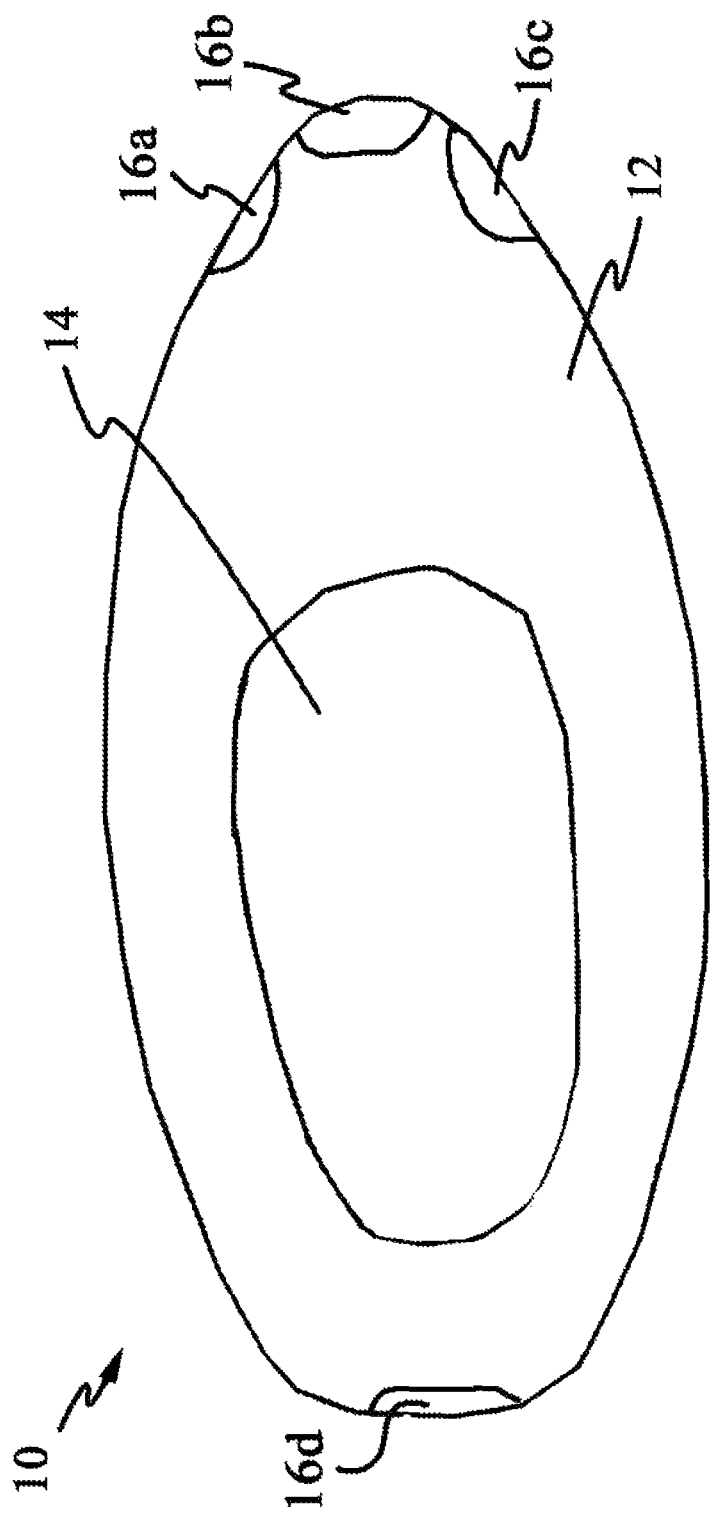
FIG. 1 is a top view of one exemplary embodiment of a water board showing an access point and lighting features.

Repeat use of reference characters throughout the present specification and appended drawings is intended to represent the same or analogous features or elements of the present technology.

DETAILED DESCRIPTION

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention covers such modifications and variations as come within the scope of the appended claims and their equivalents. Other objects, features, and aspects of the present invention are disclosed in or may be determined from the following detailed description.

Repeat use of reference characters is intended to represent same or analogous features, elements or steps. It is to be understood by one of ordinary skill in the art that the present discussion is a description of exemplary embodiments only, and is not intended as limiting the broader aspects of the present invention.

For the purposes of this document two or more items are "mechanically associated" by bringing them together or into relationship with each other in any number of ways including a direct or indirect physical connection that may be releasable (snaps, rivets, screws, bolts, etc.) and/or movable (rotating, pivoting, oscillating, etc.) Similarly, two or more items are "electrically associated" by bringing them together or into relationship with each other in any number of ways including: (a) a direct, indirect or inductive communication connection, and (b) a direct/indirect or inductive power connection. Additionally, while the drawings may illustrate various electronic components of a system connected by a single line, it will be appreciated that such lines may represent one or more signal paths, power connections, electrical connections and/or cables as required by the embodiment of interest.

The term "universal" used with wireless controller means such wireless controller may be reconfigured/programmed to control a plurality of devices but not necessarily all possible devices.

This document includes headers that are used for place markers only. Such headers are not meant to affect the construction of this document and do not in any way relate to the meaning of this document nor should such headers be used for such purposes.

While the particulars of the present invention and associated technology may be adapted for use with any type of device with electronic systems (model vehicles, powered land devices, powered water devices, the examples discussed herein are primarily in the context of powered devices to be used while standing.

Referring now to FIG. 1 is a top view of a surfboard (10) showing an access point, covered by access hatch (14), and lighting features according to one exemplary embodiment of the invention. For the presently preferred embodiment of the invention surfboard (10) is the general size and shape of a traditional surfboard. Surfboard (10) comprises access hatch (14) for covering an access point configured to allow access to interior components. Such access hatch (14) does not necessarily form a water tight seal. Toward the front of surfboard (10) are light modules 16a, 16b and 16c. It should be appreciated that the location, size and shape of such light modules is for illustration purposes only and may be of any shape and size and positioned in other locations and that additional light modules may be added without departing from the scope and spirit of the invention.

For the present embodiment of the invention, Light modules 16a, 16b, 16c, and 16d are low voltage; low power consumption modules that include a self-contained replaceable battery. One suitable light technology includes light emitting diodes (LED). Such light modules are releasably associated with surfboard (10). For the preferred embodiment such light modules are electrically associated with a controller associated with a user. Such a configuration allows remote activation of the light modules as defined later in this document. Alternatively, such light modules may simply comprise a switching device that is actuated to turn the light module on/off. One possible switch type is a magnetic switch such as a reed switch or Weigand wire that is actuated using a magnetic element. Such a switch enhances the ability to waterproof the module. For the presently preferred embodiment, such light modules comprise wireless communication circuitry configured for communication with a controller. For one embodiment, such communication capabilities include a receiver configured to receive control signals (such as a turn on/off signal) from the controller. For such an alternative embodiment, communication capabilities include a transmitter for transmitting data to a remote device such as the controller. Such transmitted data may include, for example, battery status information. Suitable communication technologies include Bluetooth and Zigbee.

Lighting modules 16a, 16b, 16c, and 16d may further comprise a local activation mechanism for enabling and disabling the lighting modules. For such a configuration, lighting modules 16a, 16b and 16c may be disabled to prevent unnecessary power drain by the receiver. Suitable activation mechanisms include a magnetic sensor such as a reed switch, Hall Effect device, Weygand wire, or other suitable magnetic device.

For the preferred embodiment of the lighting modules 16a, 16b, 16c, and 16d comprising wireless communication capabilities, the module is fully self-contained in a substantially water proof, shock resistant light housing. Such light housing is configured for being mechanically associated with surfboard (10). In addition, for one embodiment, at least one light module is configured for being disassociated with surf board (10) and carried and used as traditional flash light.

Figure 2:
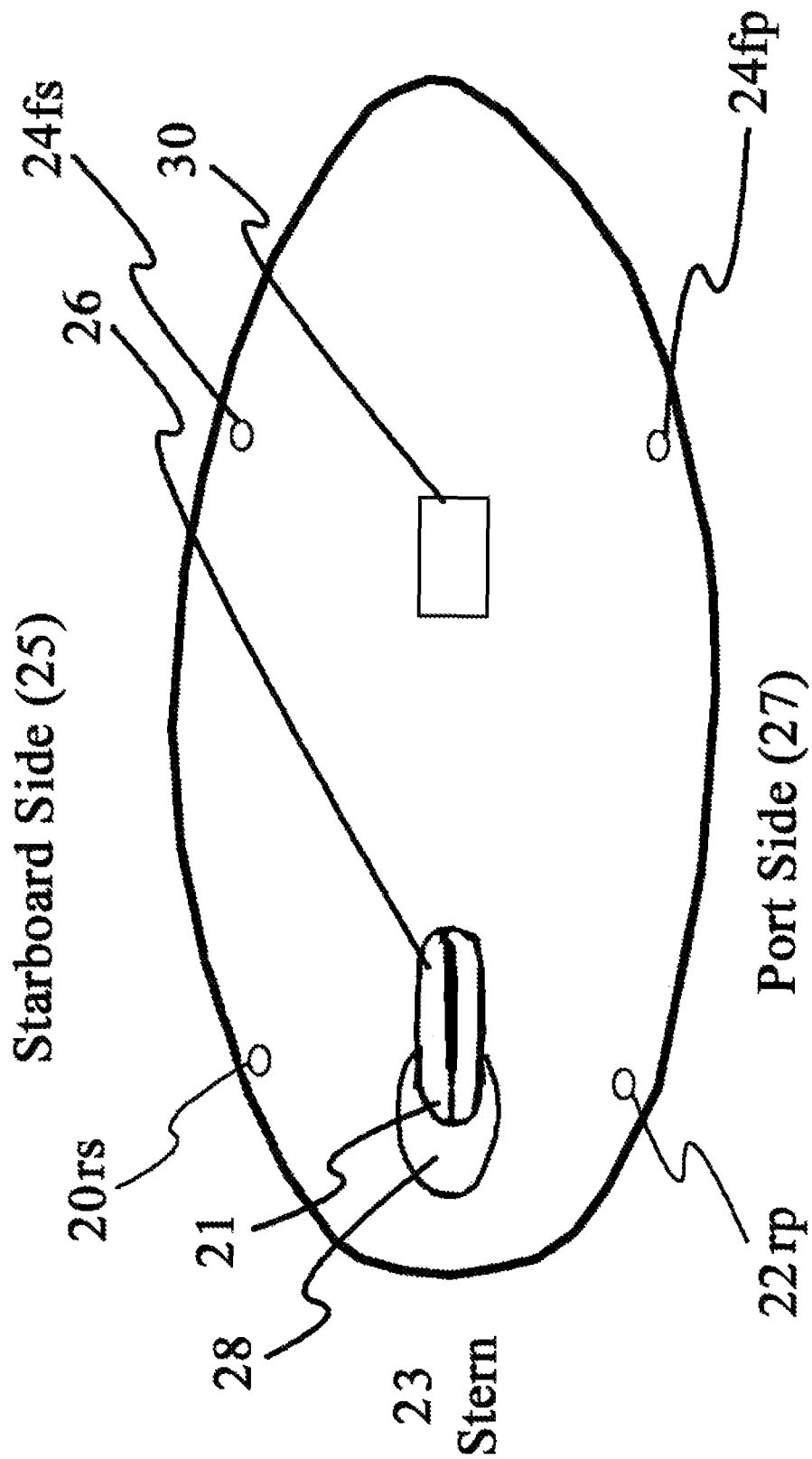
FIG. 2 is a bottom view of one exemplary embodiment of a water board showing output ports, intake, a deterrent system output ports, and a control rudder.

Referring now to FIG. 2, a bottom view of the exemplary embodiment of the present invention depicted in FIG. 1 is presented. Surfboard (10) comprises output port (20rs) (rs=rear, starboard), (22rp) and (28). It should be appreciated that any number of ports may be used, including only one port, without departing from the scope and spirit of the invention. The function of such ports will be described in more detail below.

Figure 4:
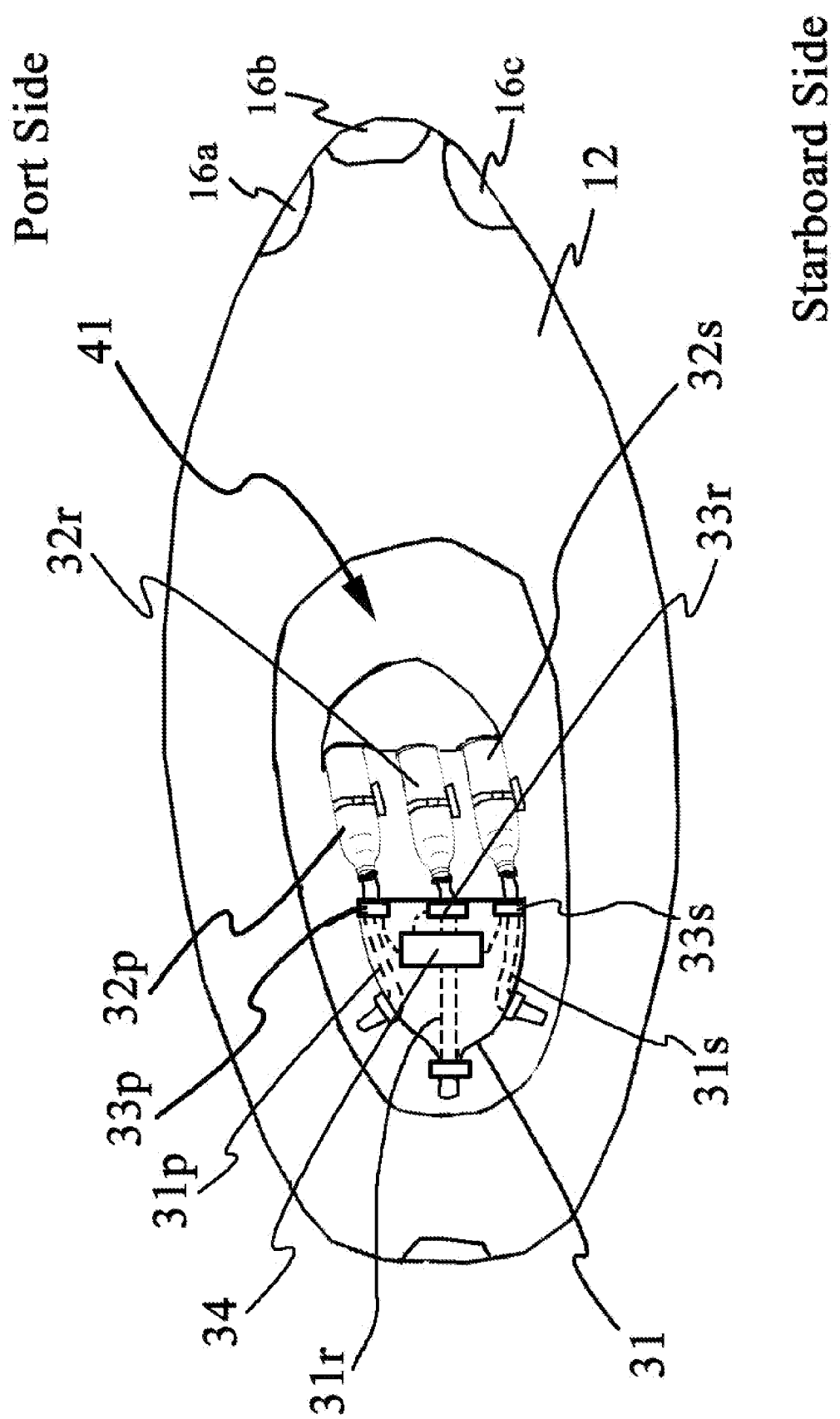
FIG. 4 is a top view of one exemplary embodiment of a water board with a access point hatch removed revealing a propulsion manifold mechanically associated with a substance-source further electrically associated with a controller.

Surfboard (10) further comprises control rudder (26). For the presently preferred embodiment, control rudder (26) is of conventional design. For one alternative embodiment, control rudder (26) is movably associated with surfboard (10) so that control rudder (26) may be rotated in respect to the bottom of surfboard (10). For such an alternative embodiment, control rudder (26) is mechanically associated with a control motor configured for rotating control rudder (26) so that the distal end (21) points toward the stern (23), the starboard (25) direction, or the port (27) direction. The control motor is electrically associated with, and is in electrical communication with, board controller (34) (FIG. 4). As will be described later, board controller (34) is in electrical communication with a remote module associated with a user.

Surfboard (10) further comprises port (30), port (24fs) (fs=front, starboard) and port (24fp). For one embodiment, such ports provide an output port for a deterrent system. Such deterrent system will be described in more detail later. For yet another alternative embodiment of the invention, any one of ports (30), (24fp) and (24fs) may be configured to provide exhaust ports for a propulsion or booster system described later.

Figure 3:
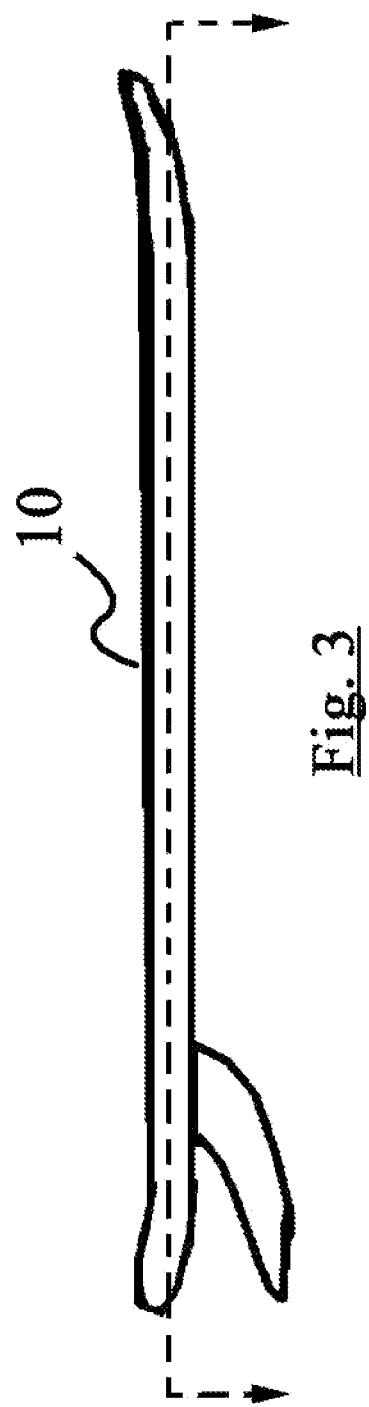
FIG. 3 is a side view of one exemplary embodiment of the water board presented in FIG. 1 and FIG. 2.

FIG. 3 is a side view of the exemplary embodiment of surfboard (10) presented in FIG. 1 and FIG. 2. As depicted in FIG. 1, FIG. 2 and FIG. 3, it should be appreciated that for the presently preferred embodiment of the invention, the physical dimensions of board (10) (length, width, and height) are similar to traditional prior art surf boards.

Referring now to FIG. 4, a top view of the exemplary embodiment of the invention depicted in FIG. 1 with access hatch (14) removed thereby revealing an internal void (41) defined by the surfboard structure (12). Disposed within the internal void (41) is a propulsion manifold (31) mechanically associated with substance-source (32r, rear), (32p, port), and (32s, starboard) via thrust-valves (33r), (33p), and (33s) respectively. The output side of thrust-valve (33r) is mechanically associated with output port (28) via manifold path (31r). The output side of thrust-valve (33p) is mechanically associated with output port (22rp) via manifold path (31p). The output side of thrust-valve (33s) is mechanically associated with output port (20rs) via manifold path (31s).

For the presently preferred embodiment, thrust-valves (33) are flow control components electrically associated with controller (34). Such flow control components comprise an input and an output separated by an electrically controlled valve component. The valve component is configured for receiving control signals from controller (34) and changing its open/closed state based on such control signals. Such control signals may simply be a power signal supplied to a valve component or, alternatively, a signal received by an onboard valve controller depending on the valve configuration.

As one of ordinary skill in the art will appreciate, a powered riding apparatus user may use a control module associated with the user's hand to generate wireless signals that are received by controller (34) which in turn generates thrust-valve control signals that cause the associated thrust-valves to manipulate the acceleration generated by a propulsion system.

For one alternative embodiment, controller (34) is configured with an accelerometer configured to generate acceleration data that is used by controller (34) to automatically limit the acceleration of the power writing apparatus to a predefined value. Ideally, for powered riding apparatuses where a user stands on such apparatus (such as a surfboard), acceleration of the powered riding apparatus would be limited to 1.0 G. For such configuration, the user may simply generate and transmit a simple on/off signal to controller (34) which may be configured to automatically limit (and/or maintain as much as possible) acceleration to a predefined value such as 0.7 Gs. Alternatively, controller (34) may simply automatically limit maximum acceleration to a maximum value but allow the user to manipulate acceleration below such maximum value. For example, if controller (34) is preprogrammed for a maximum acceleration of 1 G, a user may be allowed to generate control signals to manipulate the acceleration of the powered riding apparatus between 0 Gs and 1 G but not more than 1 G.

Exemplarily embodiments of electronic thrust-valves (33) include a magnetic latching valve, a motor driven valve, and electrically controlled solenoid valve. Thrust-valves (33) may be electronically controlled: (i) close and prevent a substance within substance-source (32) from exiting the substance container, (ii) open and allow a substance within substance-source (32) to exit the substance container and flow into propulsion manifold (31) and out an output port, and (iii) open and allow a substance to be injected into substance-source (32) thereby replenishing/recharging substance-source (32). The electrical association between thrust-valves (33) and controller (34) may be a wired or wireless connection communication and/or power connection.

For one alternative embodiment, thrust-valve (33) may be a one-way valve. For such configuration, thrust-valves (33) comprise a check-valve to prevent reverse flow. Substance-sources (32) are recharged by either replacing substance-sources (32) or removing substance-sources (32) from surfboard (10), recharging/replenishing substance-sources (32), and reinstalling substance-sources (32). Alternatively, the mechanical connection between substance-sources (32) and propulsion manifold (31) may be removed and a recharging/replenishing device mechanically associated with substance-sources (32) allowing substance-source (32) to be recharged/replenished without removing substance-source (32) from surfboard (10).

It should be appreciated that substance-source (32) comprises a container for holding a substance that can be expelled at relatively high speeds to create thrust. One suitable embodiment of a substance-source (32) comprises a container configured for storing a gas under high pressure. For example, substance-source (32) may be a tank or module for housing compressed gases such as air or $CO_2$. Additionally, while the preferred embodiment comprises an independent substance-source (32) for each flow path, alternative embodiments using only one substance-source (32) connected to multiple flow paths fall within the scope and spirit of the present invention.

Further, the propulsion system that generates thrust may be powered by an internal combustion engine or an electrical motor without departing from the scope and spirit of the event. For such configuration, the "thrust control components" are simply the components that control the thrust generated by the propulsion system. For the internal combustion engine configurations, the thrust control components would include a typical throttle-controller in electrical communication with controller (34). Similarly, for electric motor configurations, the thrust control components would simply be a power-controller that manipulates the voltage and/or current supplied to the electrical motor where such power-controller is in electrical communication with controller (34). It will be appreciated that "electrical communication" may be achieved using wired or wireless technology.

Motorized Land Board

Figure 5:
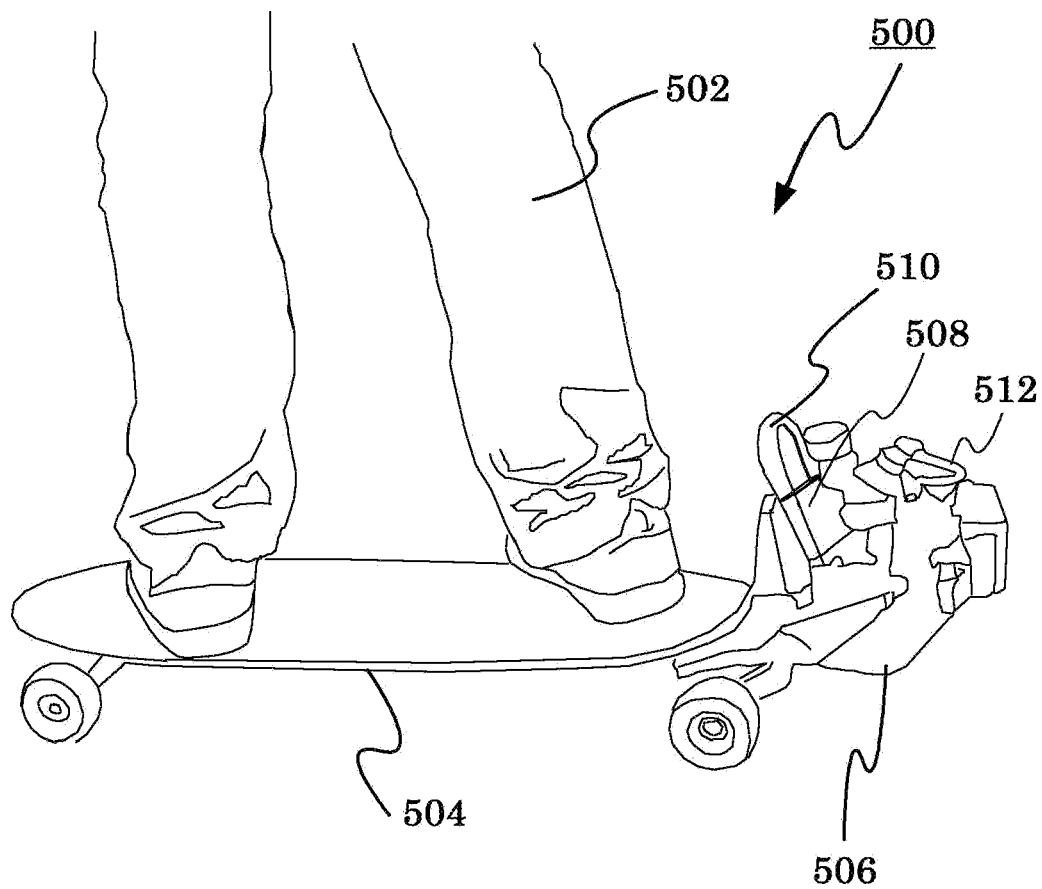
FIG. 5 is a side perspective view of one exemplary embodiment of a user riding one exemplary embodiment of a powered riding apparatus.

Referring now to FIG. 5, a side elevated perspective view (500) of a user (502) on one exemplary motorized land apparatus (i.e. a land board) (504) is presented. It should be appreciated that a "motorized land apparatus" may be any powered device configured to be ridden on land such as skates of all types, skateboards, longboards (essentially a surfboard on wheels), and off-road "all terrain" boards. For the currently preferred embodiment, motorized land board (504) is a skateboard associated with a liquid fuel powered motor (506) mechanically and/or electrically associated with machine control module (508). Notably, the propulsion system of the motorized land board (504) may be a liquid fuel (such as gasoline) based engine, a solid fuel based engine, and an electric motor without departing from the scope of the current invention. It should be noted that for this document, a gas powered "motor" and a gas powered "engine" refers to the same device (i.e. "motor" and "engine" are the same).

Figure 5B:
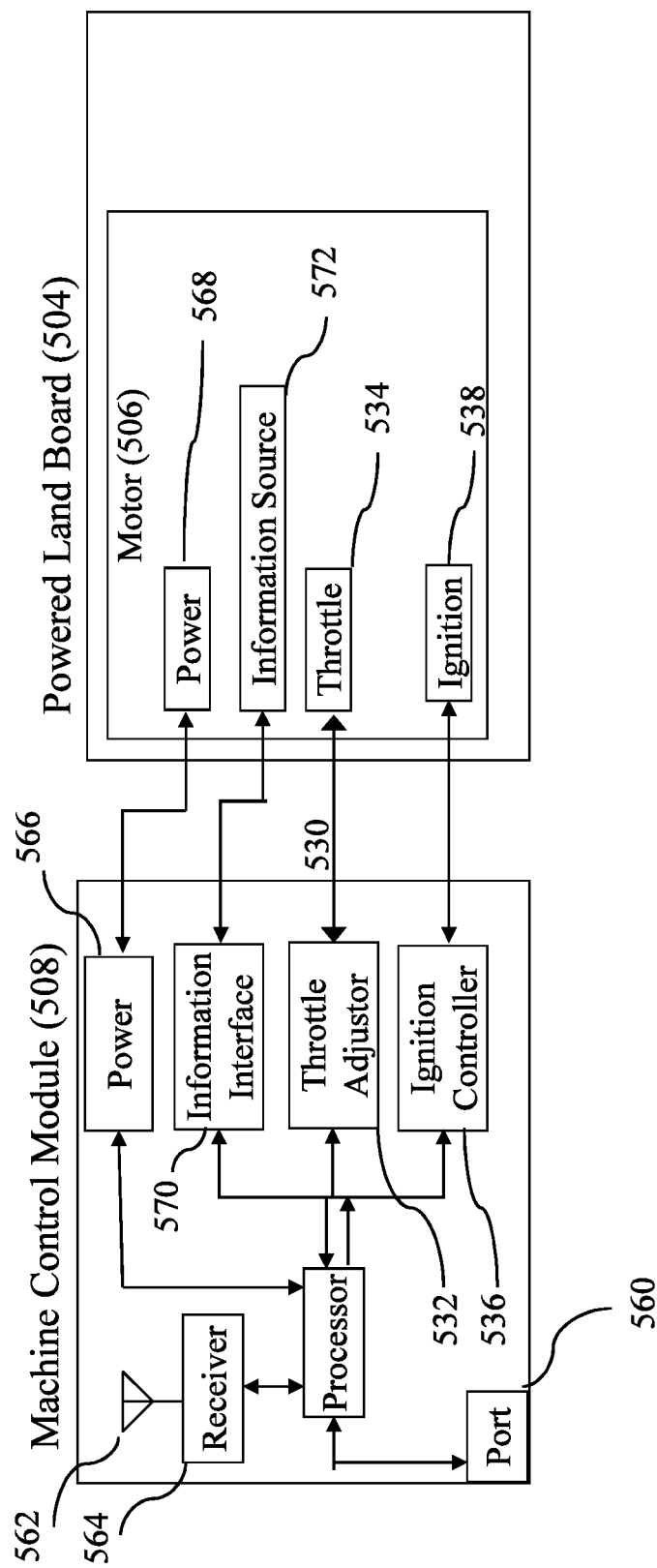
FIG. 5b is a block diagram representation of one exemplary motorized land board with an electronic control module.

Referring now to FIGS. 5 and 5b, for the current embodiment, the throttle control system (534) for the fuel powered motor (506) is mechanically associated via a cable and/or linkage (530) with a throttle adjustor (532). Any suitable technology may be used as a throttle adjustor including (a) electrical servos that provide feedback to the control module (508) or, alternatively, (b) a simple motorized device configured to open and close the throttle (534). Such throttle adjustor (532) devices are preferably at least partially disposed inside of machine control module (508). Additionally, machine control module (508) may comprise an ignition controller (536) configured to control any of the motorized land boards (504) ignition components (538) such as the stator, coil, or electronic ignition. For one alternative embodiment, ignition controller (536) comprises a CDI ignition system (Capacitor Discharge Ignition that may be programmable and dynamically and remotely controlled) that controls the spark generated by the system and transferred to plug (512). CDT ignition systems are well known in the art and a detailed description thereof is not necessary for providing an enabling disclosure of the invention. Machine Control module (508) comprises at least one of an external antenna and an internal antenna (562). For one embodiment, handle (510) comprises an antenna electrically associated with a transmitter or receiver (564) disposed in machine control module (508). The specifics of the machine control module (508) will be discussed in more detail below.

The Machine Control Module may further contain a power source (566) which may be a self-contained power source (i.e. no power connections to external power sources) or may be further configured for being connected to a power generator (568) associated with motor (506) or an external charger such as a photovoltaic device.

Information Interface (570) is configured for being associated at least one external information source such as information source (572) associated with powered land board (504). For the embodiment depicted in FIG. 5b, such information source (572) may be one or more of: (a) a temperature sensor configured for generating sensor signals representative of a temperature including the motor temperature and ambient air temperature, (b) a RMP sensor configured for generating sensor signals representative of the motors RPMs, (c) a fuel sensor configured for generating sensor signals representative of the amount of fuel remaining in a fuel source, (d) a power quality sensor configured for generating sensor signals representative of output power levels of power generator 568, and (e) a speed sensor configured for generating sensor signals representative of the speed of the motorized land board (504).

As noted above, one information source (572) may be an accelerometer configured to transmitting acceleration data to the information interface. For such configuration, control module (508) may be further configured to limit acceleration as described previously using at least one of throttle adjustor (532) and ignition controller (536).

Port (560) may be configured for any number of uses including programing the processor or updating firmware or interfacing the processor with an external controller associated with a user. Port (560) may use inductive communication, wireless communication, and wired communication technologies. Such communication technologies are well known in the art.

For four wheeled land vehicles, motorized land board (504) may use air filled, liquid filled, and/or solid filled tires. For road boards, motorized land board is about 4 feet to 6 feet long with the motor disposed at the rear of the board as depicted in FIG. 5. The output of the motor is linked to the rear axle connecting the rear tires with a chain and sprocket. One alternative embodiment is to position the motor so the output of the motor turns a shaft that is connected at least one rear tire.

For yet another alternative embodiment, land board (504) may or may not contain a motor for generating acceleration. For example, Land board (504) may be simply a board that is used to coast down hills (for example). For such configuration, control module (508) may simply be a device for activating an electronic braking mechanism to help slow down land board (504). The electronic brake would be associated with at least one of the wheels or axles of land board (504)

where the activation circuit electrically associated with either the ignition controller or a throttle adjustor where such controller or adjustor is configurable/programmable to activate the electronic brake.

Wireless Glove Interface

Generally speaking, a wireless glove interface presented within this document is an electronic apparatus configured for converting a user motion to an electronic signal that is transmitted to a remote electronic device such as controller (34). Such user motion can be 1 dimensional, 2 dimensional, or 3 dimensional. It should be appreciated that such a wireless glove interface can be used to communicate with any number of electronic modules/electronic devices depending on its configuration and programming. Thus, the wireless glove interface is defined as a universal wireless controller. As will be presented below, embodiments of such universal wireless controller can be programmed so that the wireless signal it transmits can be used by a remote "controller" device to perform a plurality of functions including keyboard, mouse, and apparatus movements and actions.

Initially, the wireless controller application will be configured as a controller for a powered riding apparatus.

Figure 6:
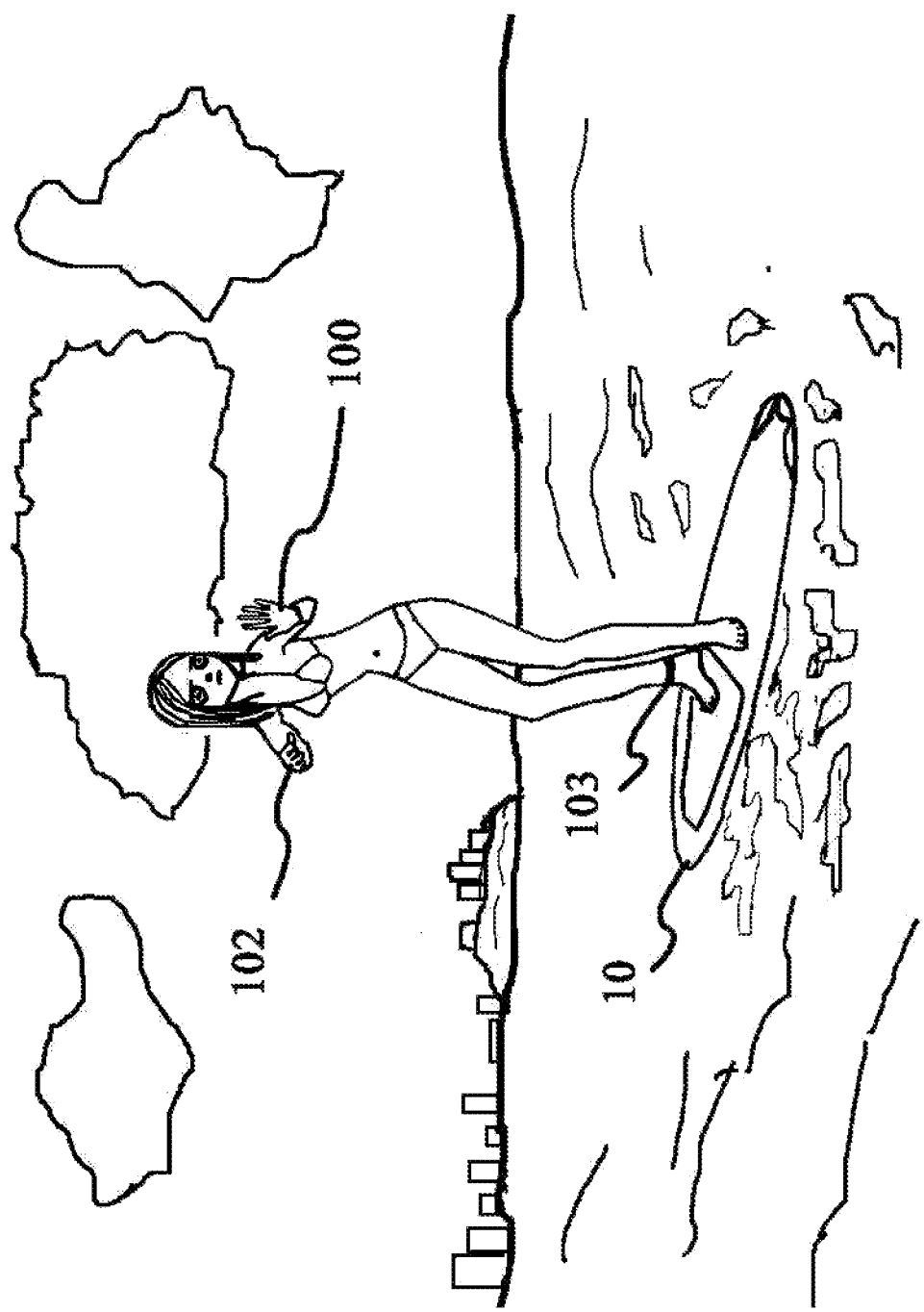
FIG. 6 is a top perspective view of one exemplary embodiment of a user standing on a water board where the user is associated with a wireless controller incorporated into a user module.

Referring now to FIG. 6, a side perspective view of a surfboard according to one exemplary embodiment of the invention is presented with a user standing on the surfboard (10) where the user is associated with a user interface (100). For the presently preferred embodiment, user interface (100) comprises a glove structure associated with an electronic module (112, FIG. 7). A second user interface (102) may be associated with the other user's hand. Additionally, the user may be further associated with an ankle strap (103). Such user interfaces and ankle strap devices are configured with wireless technology for remotely controlling surfboard (10) features.

For example, ankle strap (103) may be configured with wireless technology that is in communication with controller (34). The ankle strap (103) transmits a low powered transponder signal that is received by controller (34). Controller (34) may be configured to perform a variety of functions depending on whether or not the transponder signal is present. For example, should a user wearing ankle strap (103) fall off of surfboard (10), the transponder signal would be lost and controller (10) would deactivate/activate a surfboard feature.

Figure 7:
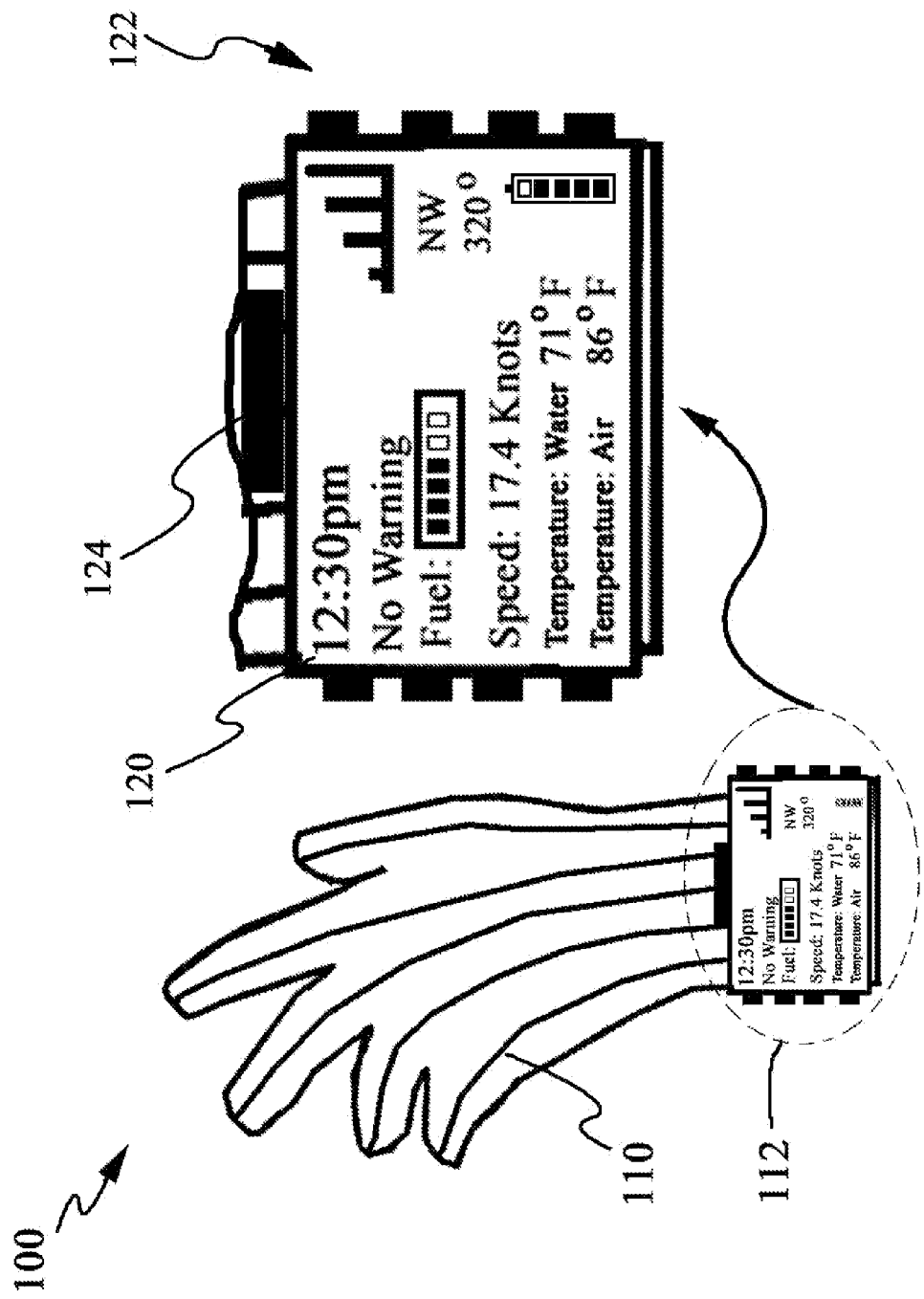
FIG. 7 is a top view of one exemplary embodiment of a wireless controller incorporated into a user module including one exemplary display format.

Referring now to FIG. 7, one exemplary embodiment of a user interface (100) is presented. User interface (100) comprises a glove structure associated with an electronic module (112). Electronic module (112) comprises wireless communication technology for sending and receiving data signals. Electronic module (112) further comprises a user display (120) for displaying information to a user. User display (120) is configured to allow any desired user orientation relative to the glove. For example, user display (120) may be rotated so that display (120) has the same orientation as a typical watch and such orientation may change when the user moves interface (100).

For one preferred embodiment, the power source is a long life lithium battery capable of powering electronic module (112) for at least ten years. For such an embodiment, electronic module (112) is completely encapsulated in a potting material to prevent moisture from entering the module thereby making electronic module (112) a "throw away" device should the module malfunction or when the power source is depleted. The potting material that covers display (120) would be a transparent potting material. Alternatively, at least part of the face of display (120) may be configured to charge the modules power source using photovoltaic technology. Alternatively, electronic module (112) may be configured with an interface for inductively charging the module's power source. Such technology allows electronic module (112) to be completely sealed using a potting material as described above while extending the useful life power source.

The electronic features of electronic module (112) are described in more detailer later in this document. It should be appreciated that user interface (100) embodiments that do not include a glove structure fall within the scope of the disclosed inventions. For example, user interface (100) may be a simple handheld controller with push buttons where the handheld controller is in wireless communication with controller (34) as well as other devices.

One exemplary display (120) configuration for presenting the various data a user might wish to review is presented in FIG. 7. Such data includes time data, warning data, fuel level data, battery status data, speed data, temperature data, signal strength data, and direction data. Preferably, such display configuration is user programmable allowing the user to select the data that is to be displayed. The time data may be a current time read out or an elapsed time read out (stop watch) for other time data. The warning data may be any warning that the user module (120) is configured to generated or receive from an external device. Fuel Level data presents information relating to the substance used by the propulsion system of the apparatus in communication with user module (112). Battery Status data is displayed to inform the user of the status of the power source powering user module (112). Speed data is data related to the movement of surfboard (10) (i.e. the apparatus in communication with the user module). Temperature data is data related to the temperature of various objects such as water temperature and air temperature. Signal strength data is data describing the relative strength of a received signal for a remote transmitter whether associated with surfboard (10) or some other device. Direction data provides a user with an indication of the direction the electronic module (112) is pointing. Preferably, electronic module (112) may be configured to continuously update the direction data or only update upon receiving a user request (to save battery life). Similarly, electronic module (112) may be user configurable to update the displayed information as desired by a user. It will also be appreciated by one of ordinary skill in the art that user interface (100) comprising electronic modules without displays (i.e. no user display) fall within the scope and spirit of the present invention.

Electronic module (112) further comprises user input points (122) and (124). For the preferred embodiment, user inputs (122) are buttons located on one or more sides of electronic module (112). Such user buttons allow a user to change user display (120) as well as set selected user configurable parameters. User input (124) is a user programmable button that may be configured to perform a specific task(s) whenever user input (124) is activated. For the preferred embodiment, user input (124) is configured as a "panic button" that sends a distress signal when activate as well as causing other surfboard features to activate such as the deterrent system.

For one embodiment, the user input buttons define magnetic switches that do not physically penetrate the housing for electronic module (112). For such configurations, a magnetic element is positioned/disposed within the input button so that when the input button is pushed toward electronic module (112) the magnetic flux lines impinging a magnetic detection element within the electronic module (112) housing varies thereby signaling activation. Such a configuration enhances the waterproofing capabilities of electronic module (112).

User interface (100) is one possible device that may be used for controlling the booster system of surf board (10) or a machine control module (508) associated with a motorized land board (504) as described above or just about any electronic device. For the preferred embodiment, as a user closes her hand, a parameter of one or more control lines (110) changes. For example, the resistive value of control lines (110) changes as control lines (110) are stretched when a user makes a fist. Such changes are sensed by user module (120) and the appropriate booster system control signals are sent to controller (34). Controller (34) generates the necessary control signals to activated one or more thrust-valves (33).

Alternatively, the glove structure may be configured with a control-component that is configured to generate a control signal that is conveyed to electronic module (112). One exemplary embodiment of a control-component is a plunger switch that generates a control signal based on how far the plunger is pressed. Such a control signal may simply be a resistance value.

Wireless Glove with Magnetic Interface

Figure 7B:
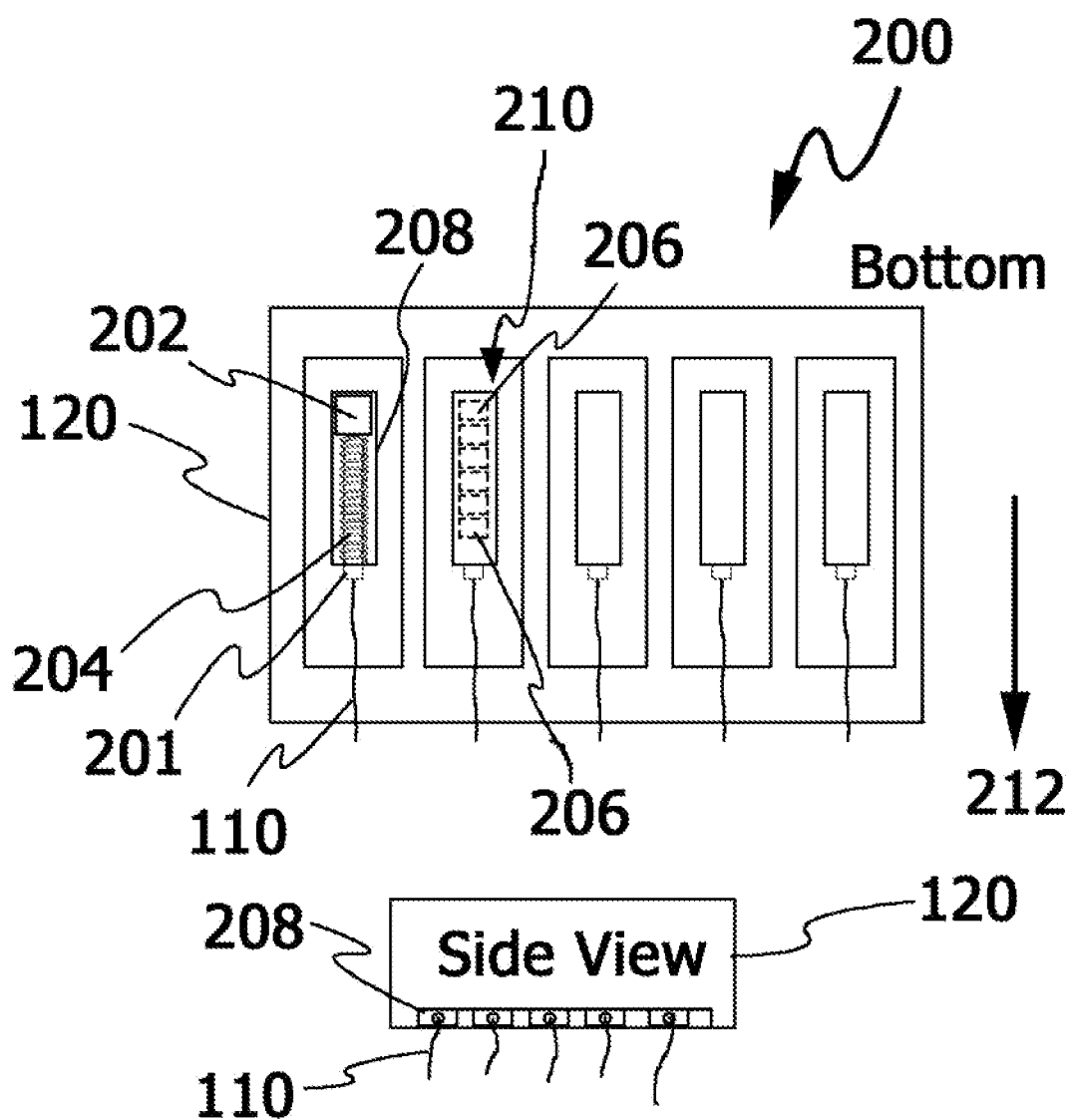
FIG. 7b is a bottom view of the controller of FIG. 7 depicting control lines and a method of coupling control signals generated by a user's hand to said controller.

Referring now to FIG. 7b, a bottom and side view (200) of one exemplary embodiment of user interface (100) as noted above and depicted. For such embodiment, user interface (100) comprises electronic module (112). As noted above, preferably, electronic module (112) is completely encapsulated in a potting material to prevent moisture from entering the module thereby making electronic module (112) a "throw away" device if the system is not configured with a recharging feature and when the power source is depleted. As noted above, alternatively, the power source for module (112) may be inductively charged requiring no direct electrical connections. The potting material that covers display (120) would be a transparent potting material.

A method of transferring user control signal from a user to interface (100) is now considered. As depicted in FIG. 7, user interface (100) is associated with a glove device configured for generating control signals used use by module (112) to generate the control signals that are transferred to thrust generator (206) or machine control module (508) to selectively activate the thrust generator or to control the throttle of a power land board as previously described Referring now to FIG. 7b, for one embodiment, control lines (110) may be strings/cables/wires that pull on and move magnetic devices (202) associated module (112). Such changes are sensed by user module (112) and the appropriate control signals are transmitted to a remote module such as controller (34) which would receive such control signals and generate the necessary control signals to activated one or more thrust-valves (33) (for the surfboard) or the throttle-controller of a powered land board.

For the configuration depicted in FIG. 7b, control lines (110) are mechanically associated with a first end of shaft (204). A magnetic device (202) is mechanically associated with a second end of shaft (204). Shaft (204) and magnetic device (202) are disposed in housing (208). Housing (208) is disposed adjacent to and outside of user module (112).

It should be appreciated that there are many variations on such design that fall within the scope of the present invention and this disclosure. For example, housing (208) may be an integral component of user module (112). Alternatively, the various housing (208) may be removably associated with user module (112). The goal is to bring magnetic device (202) in close proximity to a surface of user module (112) so that magnetic signals can be transferred to detection circuits within user module (112). One of ordinary skill in the art will appreciate that such a configuration allows a user to generate control signal (by making a fist, for example) wherein such control signals are inductively or conductively or magnetically transferred to user module (112) without providing a path that a liquid (such as water) to penetrate.

A resilient component (204) is associated with shaft (201) that biases the shaft in a default position. As shown in FIG. 7b, the resilient component (204) is a spring disposed around shaft (201) and between magnetic device (202) and an opposing wall of housing (208). As control line (110) is pulled in direction 212, magnetic device (202) moves toward the opposing end of housing (208) thereby compressing resilient component (204). As the pulling force on control line (110) is removed, resilient component (204) moves magnetic device (202) back toward the default position.

Within user module (112) a magnetic sensor circuit (206) is disposed in a location that will be adjacent to each magnetic device (202) so that sensor circuit (206) may receive magnetic information from magnetic device (202). For the embodiment depicted in FIG. 7, sensor circuit (206) comprises a series of aligned magnetic sensors. As magnetic device (202) moves toward the opposing wall of housing (208) as described above, a first magnetic sensor will receive less information from magnetic component (202) while a second magnetic sensor will receive more information from magnetic component (202). The controller uses such information to perform a predefined action.

For example, suppose magnetic component (202) is a permanent magnet and a series of magnetic sensors (206) are disposed in user module (112) in a location that places such series of magnetic sensors in alignment with the path of movement of magnetic component (202). The series of magnetic sensors (206) in FIG. 7b comprises six sensors in alignment along slot 208. As magnetic component (202) moves along the slot (208), such movement caused by a user making a first and thereby pulling on string 110 which pulls on shaft (201), a different magnetic sensor in the series of magnetic sensors is activated. When the magnet is in position 6, magnetic sensor 6 is activated. User module (112) detects that sensor 6 has been activate and generates the corresponding control signal. For this example, such a control signal may be a "full throttle" signal. As the user opens his fists, resilient component (204) pulls magnetic sensor (202) back to the "home" position.

Alternative embodiments for the embodiment depicted in FIG. 7 monitor an electrical parameter of the control lines (110) or associated with such control lines and such control lines may be directly electrically associated with circuits within user module (112). For example, as a user closes her hand, an electrical parameter of one or more control lines (110) changes. For one embodiment, control lines (110) form an electrical circuit associated with user module (112). Module (112) applies a voltage to control lines (110) and measures the resulting current. When the control lines are stretched by closing the hand and making a fist, the resistive value of control lines (110) changes and such changes are detected by module (112) and module (112) generates the appropriate control signals to be transmitted to an remote device.

It should be further appreciated that other means of generating control signals may be used in place of such glove configuration. For example, a simple push button device may be electrically associated with module (112) for generating such control signals. Additionally, such "glove features" may be replaced by just the control lines that extend to fingertip caps or that are configured for being placed over or inside a glove.

Controller and User Interface

Attention will now be directed more specifically to exemplary embodiments of the controller (34) and user interface (100) configurations. It should be noted that user interface (100) sends control signals to controller (34), and thus, "controls" controller (34). Consequently, user interface (100) could also be labeled a "controller". In an attempt to minimize confusion, this document endeavors to refer to user interface (100) as simply the "user interface" or the "wireless glove controller" depending on the configuration being considered whereas controller (34) may be generically referred to as the "apparatus controller".

Figure 8:
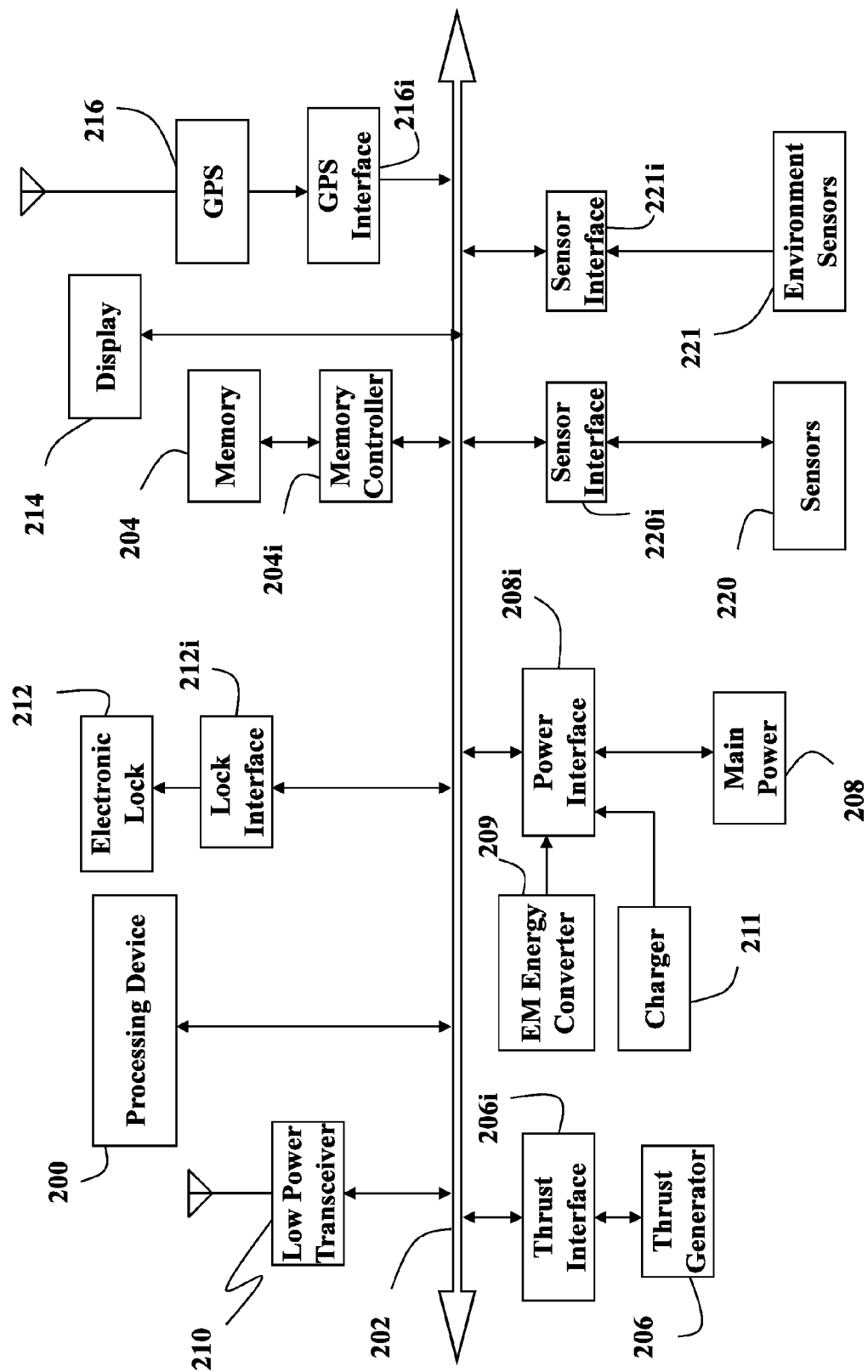
FIG. 8 is a block diagram representation of one exemplary controller configuration.
Figure 9:
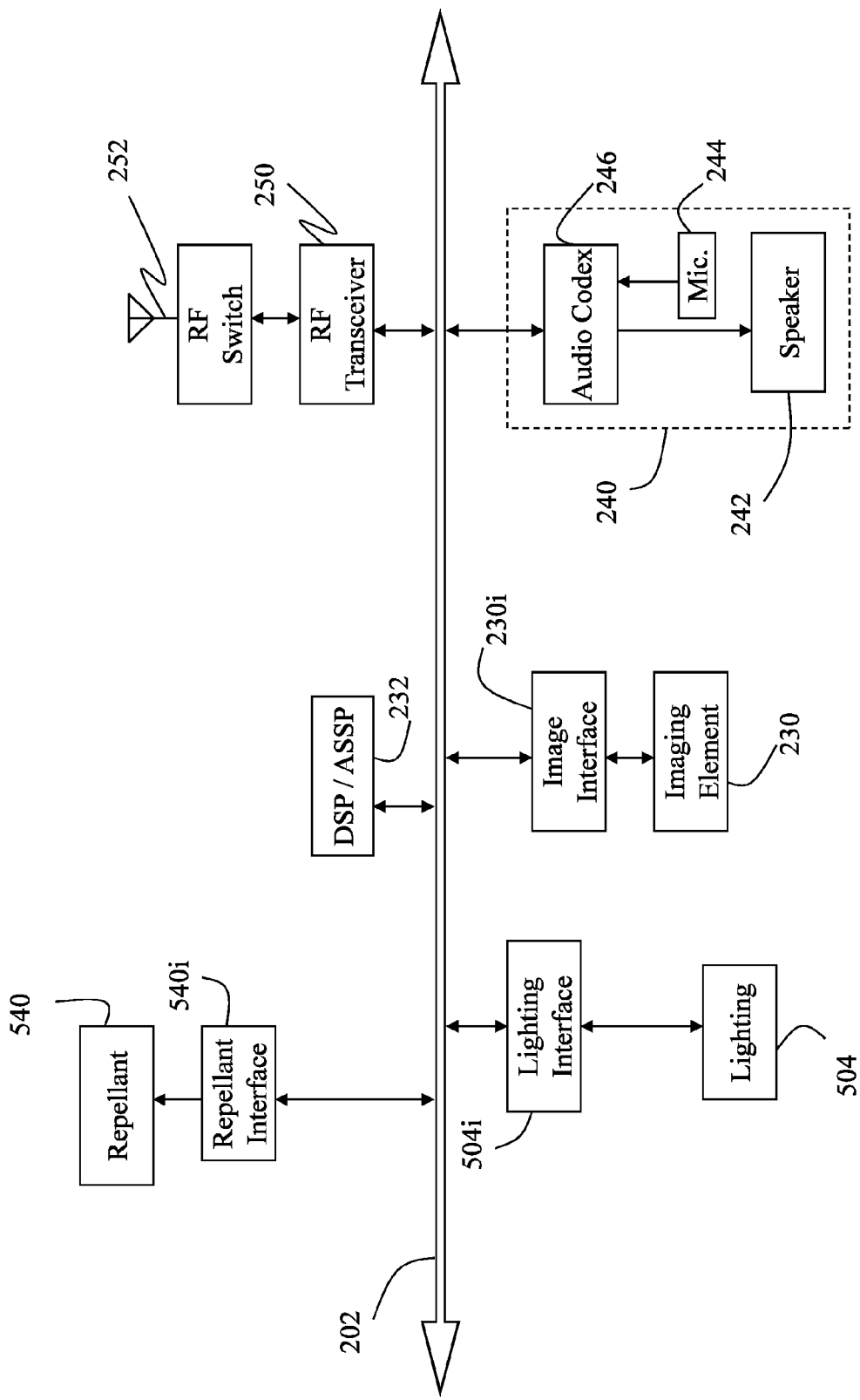
FIG. 9 is a continuation of the block diagram representation of FIG. 8.

Referring now to FIG. 8 and FIG. 9, a block diagram representation of the various electronic components of controller (34) is presented. It should be appreciated that user interface (100) may use the same or substantially similar components. After the components of controller (34) are described, exemplary embodiments of user interface (100) are considered.

Initially it should be appreciated that FIG. 8 presents just one of a plurality of methods of electrically associating the various electronic components to achieve the features desired. For example, FIG. 8 presents the use of a common bus (202) for electrically associating the various components. It should be appreciated that embodiments where certain devices are electrically associated with each other without the use of a bus fall within the scope of the invention. In addition, various embodiments of controller (34) may include all the features presented in FIG. 8, only a subset of subset of such features as well as features not specifically presented in FIG. 8.

Further, many of the components and the associated configurations and connections represent general-purpose devices that are well known in the art. Applicant's novel features include at least one of the device specific programming, thrust interface controllers, and environmental sensor combinations, as well as the various universal glove control features.

Controller

The first "controller" configuration considered is associated with the previous described surfboard (10). For the presently preferred embodiment, controller (34) comprises either an electronic module integral to surfboard (10) or mechanically associated with surfboard (10) (although such controller could be associated with any powered riding apparatus with thrust/acceleration control mechanisms). For such exemplary embodiments, controller (34) is preferably completely encapsulated in a potting material to prevent water contamination. Additionally, any wired connections between controller (34) and external devices are preferably achieved using a non-wicking wiring system. Additionally, it should be appreciated that many of the electronic components for controller (34) are similarly suitable for user interface (100).

The functional blocks of FIG. 8 represent components well known in the art such as ASSPs (Application Specific Standard Product), Complex Programmable Logic Devices (CPLD), ASICs (application specific integrated circuit), microprocessors, or PICs. In addition, one or more functional blocks may be integrated into a single device or chip sets such as ASSP chip sets. For example, one or more of the various interfaces described below may be integrated into (or have its described functions performed by) processing device (200). Such devices are well known in the art.

There are many manufactures of suitable ASSP devices including Motorola, and Texas Instruments. While most of the functions are preferably performed by ASSP chip sets, Complex Programmable Logic Devices (CPLD) may be used to interface the various ASSP blocks to system bus (202) allowing one system component to interface with another component. Manufactures of suitable CPLD devices include Lattice's (ispMACH 4000 family) and (Altera's MAX 7000-series CPLD).

For the presently preferred embodiment of the invention, processing device (200) is configured for controlling the various systems of surfboard (10) including the data management system, communication system, power management system, deterrent system, propulsion system, lighting system, environmental and user sensor systems, imaging/sound system, anti-theft system, and entertainment system. Processing device (200) may be a simple PIC (such as the ones manufactured by MicroChip) or a relatively more complicated processor configured for use with standard operating systems and application software. Other technologies that may be used include ASICs (application specific integrated circuit) and ASSPs (application specific standard product). Processing device (200) may comprise onboard FLASH, ROM, RAM, EPROM type memories. Such devices and their electrical connections/associations are well known in the art.

Processing device (200) is electrically associated with bus (202). Bus (202) is a typical prior art communication bus configured for providing a communication path between the various electronic devices electrically associated with bus (202). For example, Bus (202) is configured for transferring data signals between processing device (200) and other electronic devices electrically associated with bus (202). For the preferred embodiment, bus (202) also comprises electrical paths for transferring power between main power (208), EM energy converter (209), charger (211) and other electronic devices electrically associated with bus (202). Bus (202) may further comprise a data port and or a power port configured for supplying/receiving power or providing a communication path to electronic devices electrically associated with such port.

Memory (204) is electrically associated with bus (202) via memory controller (204i). Memory (204) may be any type of memory suitable for storing data such as flash memory, SRAM memory, hard drive memory, as well as other types of memories. Volatile memory continuously connected to a power source may be used, although, for the preferred embodiment, memory (204) is nonvolatile memory. Memory (204) may be used for storing all types of data including application programs, image data, sound data, customer information, sensor data, and warning-criteria. Memory (204) is electrically associated with processing device (200) via memory controller (204i) and bus (202).

DSP/ASSP (232, FIG. 9) is electrically associated to processing device (200) via bus (202). DSP (232) is configured to perform signal processing tasks such as voice, audio, video, encoding, decoding as well as other data and signal processing functions. DSP/ASSP technologies are well known in the art and a detailed description thereof is not necessary to provide an enabling description of the present invention.

Display (214) is configured for displaying the various system data received or generated by controller (34). Display (214) is electrically associated with bus (202) and may include technology for providing a customizable touch screen controller configured for control and decoding functions for display (214). For the preferred embodiment display (214) is a LCD display. Additionally, for one embodiment, display (214) comprises a "memory" configured to provide an image when power is removed from the display. For this embodiment, an image is written on the LCD display and when power is removed, the display will retain the image virtually indefinitely. Such a LCD display uses a technique developed by Zenithal Bistable Devices (ZBD), which adds a finely ridged grating to the inner glass surface of an LCD cell of Super-Twist-Nematic (STN) construction. As is known in the art the presence of the grating "latches" the polarization state of the liquid crystals and retains it when power is removed. Preferably, hatch (14) comprises display-section that is at least partially transparent to allow viewing of display (214) without removing the hatch. Alternatively, controller (34) may be disposed within (i.e. housed by) hatch (14)

Controller (34) may further comprise a graphics accelerator that provides support for megapixel cameras and 3D graphics applications. One suitable graphics accelerator is the MQ2100 manufactured by MediaQ. For such a configuration, an imaging device (describe later) associated with board (10) or the board user may be used to record images that are stored in memory (204) and displayed on display (214) upon user request. Much of the above technology is similar to that found in cellular telephones and thus is known in the art.

The more novel features of a controller (34) include its association with thrust generator (206) electrically associated with processing device (200) through thrust interface (206i). For the presently preferred embodiment, thrust generator (206) comprises propulsion manifold (31), substance-source (32), and thrust-valves (33). Processing device (200) is configured to receive propulsion control signals from user interface (100). Upon receiving such propulsion control signals, processing device (200) generates the corresponding control signals that are transferred to thrust interface (206i) which selectively activates the appropriate thrust-valves to generate the desired thrust. Alternatively, the signals received from user interface (100) may be directly routed to thrust interface (206i).

As noted above, an accelerometer may be electrically associated with processing device (200) or thrust interface (206i) to generate acceleration data which would be used to control acceleration. For one alternative embodiment, environmental sensors (221) include an accelerometer. The accelerometer generates acceleration data which are transferred to processing device (200) (depending on the configuration) which is configured to generate control signals to manipulate the appropriate thrust-valves so that a maximum predefined acceleration threshold is not exceeded. Further, processing device (200) may be programmed to maintain, as best as possible, a predefined acceleration. For powered riding apparatuses where a user stands on such power riding apparatus (like a surf board and land board) such acceleration limit value is preferably between 0.5-Gs and 1.0-Gs with an acceleration limit threshold of 0.8 Gs-1.2 Gs. [G is about 9.8 Newtons per kilogram (N/kg) . . . (i.e. a unit of force equal to the force exerted by gravity)]

Exemplary communication circuitry is now considered. For one embodiment, relatively long range wireless communication circuitry includes RF transceiver (250) electrically associated with antenna (252). RF Transceiver (250) is configured to transmit and receive data signals to/from a remote electronic device. It should be noted that embodiments where such communication circuitry comprises only a transmitter or only a receiver fall within the scope of the invention. For one embodiment, transceiver (250) comprises a relatively low power transmitter that transmits a data signal in an unlicensed frequency band. Other embodiments include a relatively longer range transmitter comprising any number of well-known technologies for wireless communications transmitting at any legal power level. For example, transceiver (250) may be configured to communicate over GPRS, GSM, GPRS, 3G, and EDGE enabled networks as well as WAP networks.

To facilitate remote access to controller (34) a networking system, such as a local area network (LAN) or a wide area network (WAN) may be utilized. In this presently preferred embodiment, processing device (200) and memory (204) are configured to form a TCP/IP protocol suite and an HTTP (HyperText Transfer Protocol) server to provide two-way access to the surfboard (10) data. Such TCP/IP protocols and HTTP server technology are well known in the art. For such an embodiment, user controller (34) include an HTTP server and a TCP/IP protocol stack. Further, controller (34) would be configured to receive wireless communication signal such as those typically transmitted over a cellular network.

Generally speaking, a gateway may simply be a means for connecting two already compatible systems. Alternatively, a gateway may be a means for connecting two otherwise incompatible computer systems. For such an alternative configuration, the TCP/IP protocol suite may be incorporated into a gateway serving multiple controller (34) devices via a wired or wireless two-way network using, for example, Wireless Fidelity (Wi-Fi) technology. Such a gateway may incorporate an HTTP server for accessing data from multiple controller (34) devices and for transmission of data to individual user interface (10) devices. Gateway technology is well known in the art.

In the above described TCP/IP enabled controller (34) system, a remote transceiver provides access to a first network operating in accordance with a predetermined protocol (TCP/IP is one example). A plurality of controller (34) devices may comprise a second network, such as a LAN. A gateway operatively couples the first network to the second network. Finally, an HTTP server is embedded in either the gateway or the plurality of user interface (100) devices facilitating the transfer of data between the two networks. With such a configuration, one of ordinary skill in the art will appreciate that individual controller (34) device or groups of controller (34) devices may be accessed as if the controller (34) devices were a web site and their information could be displayed on a web browser.

One of ordinary skill in the art will appreciate that such a configuration enables continuous remote access to the controller (34) so that the powered riding apparatus may be remotely controlled from anywhere in the world using a wide area network (such as the Internet). Preferably, the powered riding apparatus or and associated item is configured to provide live video feed. Notably, a user associated with a universal wireless glove controller apparatus as defined herein would effectively be wirelessly tethered to controller (34) via a computer anywhere in the world allowing such user to control the powered riding apparatus with hand movements/gestures while watching the apparatus on a computer display screen. Such system preferably uses a WAN to monitor the powered riding apparatus (or simply a powered apparatus that is a drone) and RF communication technology (such as cellular phones or other wireless technology) to issue control signals. Such a configuration allows any electronic device associated with a controller (34) to be remotely controlled.

Controller (34) may further be configured for storing and/or generating location data. For embodiments that generate location data, controller (34) includes a position-finder such as GPS device (216) electrically associated with processing device (200) via bus (202) and GSP Interface (216i). GPS (216) is one embodiment of a position-finder electrically associated with a processing device where GPS (216) is configured to generate position-data for the location of controller (34). Alternative embodiments include controller (34) configurations that do not include a GPS but instead receive location data from an external device such as user interface (100).

The attributes of exemplary main power (208) are now considered. For the presently preferred embodiment, main power (208) is a long life depletable power source such as a Li Ion battery. For such embodiment, main power (208) comprises at least one long life rechargeable Li Ion battery such as the ones manufactured by A123 Systems®. Alternative embodiments include rechargeable batteries that may be recharged through a direct or inductive connection.

Extending the life of main power (208) or extending the time between recharging is one design concern addressed by power interface (208i) such as the ones found in prior art cellular phones. Power Interface (208i) is configured to perform power management functions for the system as well as monitor the status of main power (208) and report such status to devices electrically associated with bus (202) (such as processing device (200), user interface (100), etc.). Power interface (208i) dynamically addresses power management issues by selectively powering down unutilized devices. For the Preferred embodiment, power interface (208i) is a CPLD that generates chip-select signals and powers down the various ASSPs as desired. Alternatively, processing device (200) may perform such power management functions.

Imaging element (230) is electrically associated with processing device (200) through image interface (230i) and bus (202). Imaging element (230) and image interface (230i) are configured for acquiring and transferring images to electronic devices electrically associated with bus (202). For the preferred embodiment, imaging interface (230i) is configured to support CMOS image input sensors such as the one manufactured by Micron® and/or CCD (charge-coupled device) image input sensors such as the ones manufactured by ATMEL® sensors. Imaging interface (230i) performs the necessary processing functions to convert the imaging data into a desired format before transferring such data to other devices associated with bus (202). Surfboard (10) may be configured with an imaging element (230) for recording surfing activities (as well as other activities). Such image data is formatted and stored in memory (204) for later use.

Low Power transceiver (210) would typically comprise a low power transmitter relative to transceiver (250). For the embodiment in FIG. 8, low power transceiver (210) operates in an unlicensed band although frequencies requiring a license may be used. Suitable technologies include Bluetooth and Zigbee (IEEE 802.15). Zigbee is a low data rate solution for multi-month to multi-year battery life applications. Zigbee operates on an unlicensed, international frequency band. Such technologies are known and understood by those skilled in the art, and a detailed explanation thereof is not necessary for purposes of describing the method and system according to the present invention. Low power transceiver (210) is configured for short range communication with other suitably configured devices.

Attention now is directed to audio module (240). For the preferred embodiment, audio module (240) comprises sound transducer (242) and microphone (244) electrically associated with audio codex (246). Audio module (240) is configured for detecting sound waves and converting such waves into digital data of a predefined format such as MP3. Sound waves may also be generated by audio module (240) using sound transducer (232) to issue warnings and provide for other forms of communications. For example, audio module (24) may be used for voice communications between a person located at controller (34)/user interface (100) and a person located at a remote site, using, for example, VoIP for the IP enabled systems describe earlier. Audio module (240) may also be used to play MP3 files stored in memory (204) or via streaming data over a communication connection. Such technology is well known in the art.

EM (electromagnetic) Energy Converter (209) is electrically associated with power interface (208i) and mechanically associated with the top of surfboard (10). EM Energy Converter (209) is configured to convert electromagnetic energy (such as a radiated RF signal from a man-made transmitter, sunlight, etc.) into a voltage for supplying power to system components and/or supplying energy to a power source. One well known EM Energy Converter is a photovoltaic cell. Such technologies are well known in the art.

Similarly, a charger (211) may be electrically associated with power interface (208i) via a direct connection or via bus (202). Charger (211) is suitably configured for recharging main power 208 as well as providing power to controller (34).

Lighting device (504) comprises lighting modules 16a, 16b, 16c, and 16d. Any number of lighting modules may be used. Preferably, lighting devices (504) are configured to be removably associated with board (10) and include their own power source which may or may not be configured for receiving power from main power (208).

Sensors (220) and Environment Sensors (221) may be any number of devices configured to detect any number of parameters related to board (10), a user, and board (10)/user environment. Environment sensors (221) include sonar, accelerometers, thermometers, speed indicators, fuel level indicators, and motion sensors.

For one preferred embodiment, user interface (100) is configured using identical or similar technology to the technology described above for controller (34). User interface (100) may comprise devices similar or identical to any of the following (depending on the desired functionality): a processing device (200), main power (208), memory (204), display (120), RF transceiver (250), low power transceiver (210), GPS (216), DSP (232), imaging element (230), audio element (240), EM energy converter (209), and a charger (211) all electrically associated together through a bus such as bus (202). Display (120) is preferably an LCD display similar or identical to that described for display (214), although any suitable technology may be used.

It will be appreciated that while some embodiments of user interface (100) may be specifically configured for use with surfboards (10), other embodiments of user interface (100) may be configured to control a variety of powered riding apparatuses configured with electronic controls or power apparatuses in general. Such devices include powered skate boards and other devices with wheels and powered by motors or other types of propulsion systems where a wireless communication connection for transferring control signals from a user to the powered device would be beneficial. For example, where the powered device is a motorized skate board, thrust generator (206) becomes the motor and user interface (100) controls the output power of such motor.

User interface (100) may further comprise a biometric sensor. Such a Biometric sensor is used as a "key" to access controller (34)/user interface (100) functions such as the previously described electronic lock. Biometric identification refers to the automatic identification of a person based on his/her physiological or behavioral characteristics. A biometric system is essentially a pattern recognition system which makes a personal identification by determining the authenticity of a specific physiological or behavioral characteristic possessed by a user. The biometric system may include, for example, a handwriting recognition system, a voice recognition system and fingerprint recognition.

For the preferred embodiment of the invention, the sensor (220) includes a fingerprint scanner. For such embodiment of the invention, a user initially places a finger on biometric sensor (220). The biometric sensor scans the finger and transfers a digital representation of the user's fingerprint to memory (204). Such an initial bio sample is called an enrolment sample. After an enrolment sample has been stored in memory, future user controller (34)/interface (100) actions are authorized by comparing a user's real time fingerprint scan to the enrolment sample.

Universal Wireless Glove

As depicted in FIG. 7, user interface (100) is associated with a glove device configured for converting a user action to a signal detected by module (112) to generate the control signals that are transferred to thrust generator (206) to selectively activate the thrust generator as previously described above. It should be appreciated that other means of generating control signals may be used in place of such glove configuration. For example, a simple push button device may be electrically associated with module (112) for generating such control signals.

As noted previously, for the embodiment depicted in FIG. 7, as a user closes her hand, a parameter of one or more control lines (110) changes. For such example, control lines (110) form an electrical circuit associated with and monitored by module (112). Module (112) applies a voltage to control lines (110) and measures the resulting current. When the control lines are stretched by closing the hand and making a fist, the resistive value of control lines (110) changes and such changes are detected by module (112). Module (112) detects the resistance changes of control lines (110) and generates the appropriate control signals.

Alternatively, control lines (110) may define a tether (e.g. strings, cables, wires, etc.) that pull on sensors within module (112). Alternatively, a magnetic interface may be used as described above. Such signals are sensed by user module (112) and the appropriate booster system control signals are sent to controller (34). Controller (34) generates the necessary control signals to activated one or more thrust-valves (33).

The preferred embodiment of module (112) comprises a display. As previously described, one exemplary display (120) configuration for presenting the various data a user might wish to review is presented in FIG. 7. Such data includes time data, warning data, fuel level data, battery status data, speed data, temperature data, signal strength data, and direction data. Preferably, such display configuration is user programmable allowing the user to select the data that is to be displayed. The time data may be a current time read out or an elapsed time read out (stop watch) for other time data. The warning data may be any warning that the user module (120) is configured to generated or receive from an external device. Fuel Level data presents information relating to the substance used by the propulsion system. Battery Status data related to the power source associated with user module (112). Speed data is data related to the movement of surfboard (10). Temperature data is data related to the temperature of various objects such as water temperature and air temperature. Signal strength data is data describing the relative strength of a received signal for a remote transmitter whether associated with surfboard (10) or some other device. Direction data provides a user with an indication of the direction the electronic module (112) is pointing. Preferably, electronic module (112) may be configured to continuously update the direction data or only update upon receiving a user request (to save battery life). Similarly, electronic module (112) may be user configurable to update the displayed information as desired by a user.

The preferred power source is a long life lithium battery of capable of powering electronic module (112) for at least ten years. Such an embodiment, electronic module (112) is completely encapsulated in a potting material to prevent moisture from entering the module thereby making electronic module (112) a "throw away" device should the module malfunction or when the power source is depleted. Alternative embodiments include configurations where electronic module (112) comprising electronics for receiving power via a coupling method where the power is transmitted through the walls of the controller without the need for a direct connection. Such a configuration is particularly useful when electronic device (112) is encapsulated in a potting material. The electronic features of electronic module (112) are described in more detailer in co-pending application Ser. No. 12/106,323 and filed on 20 Apr. 2008.

Universal Wireless Glove User Interface

Figure 10:
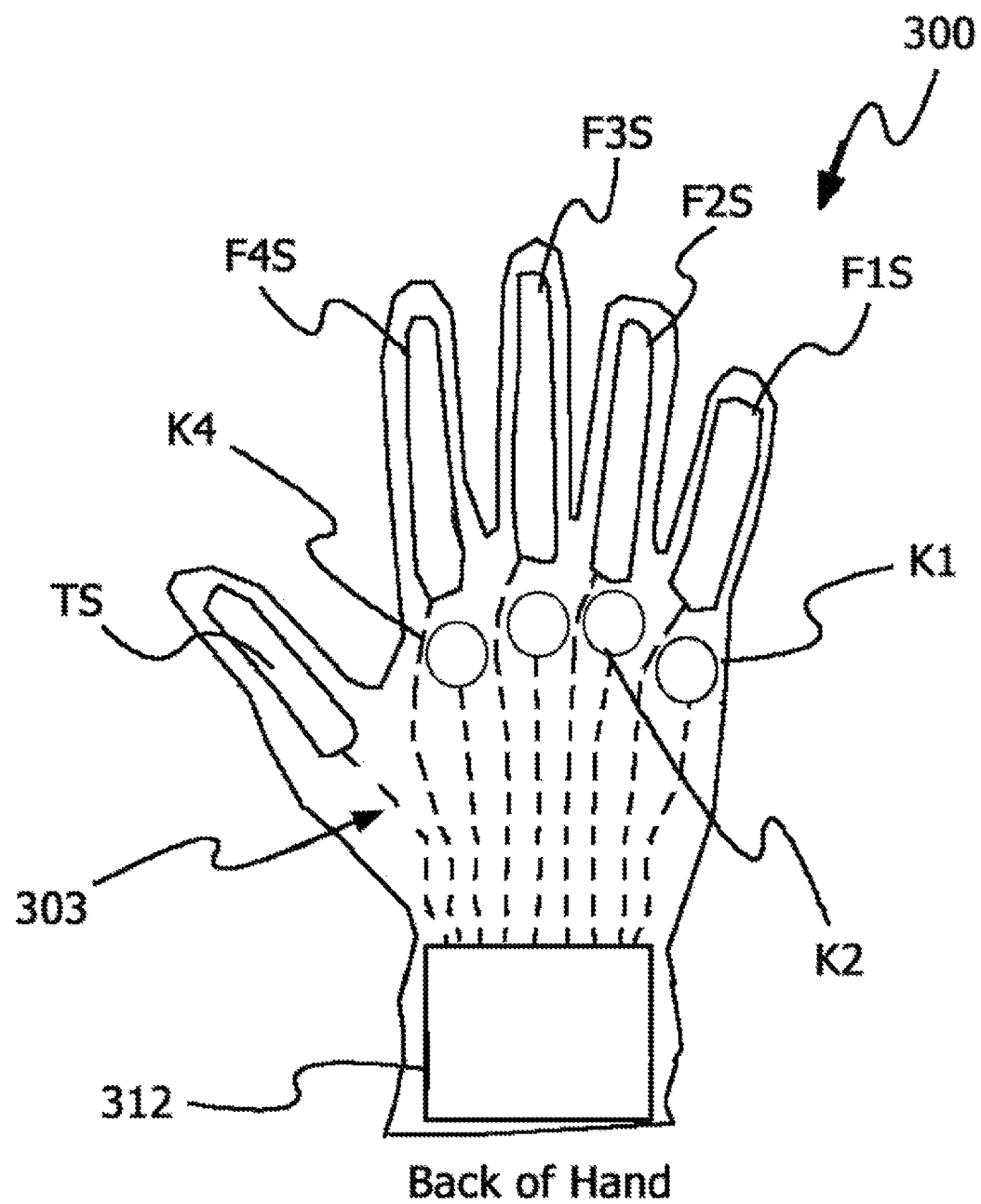
FIG. 10 is a view of the backhand side of one exemplary embodiment of a universal wireless glove controller.
Figure 11:
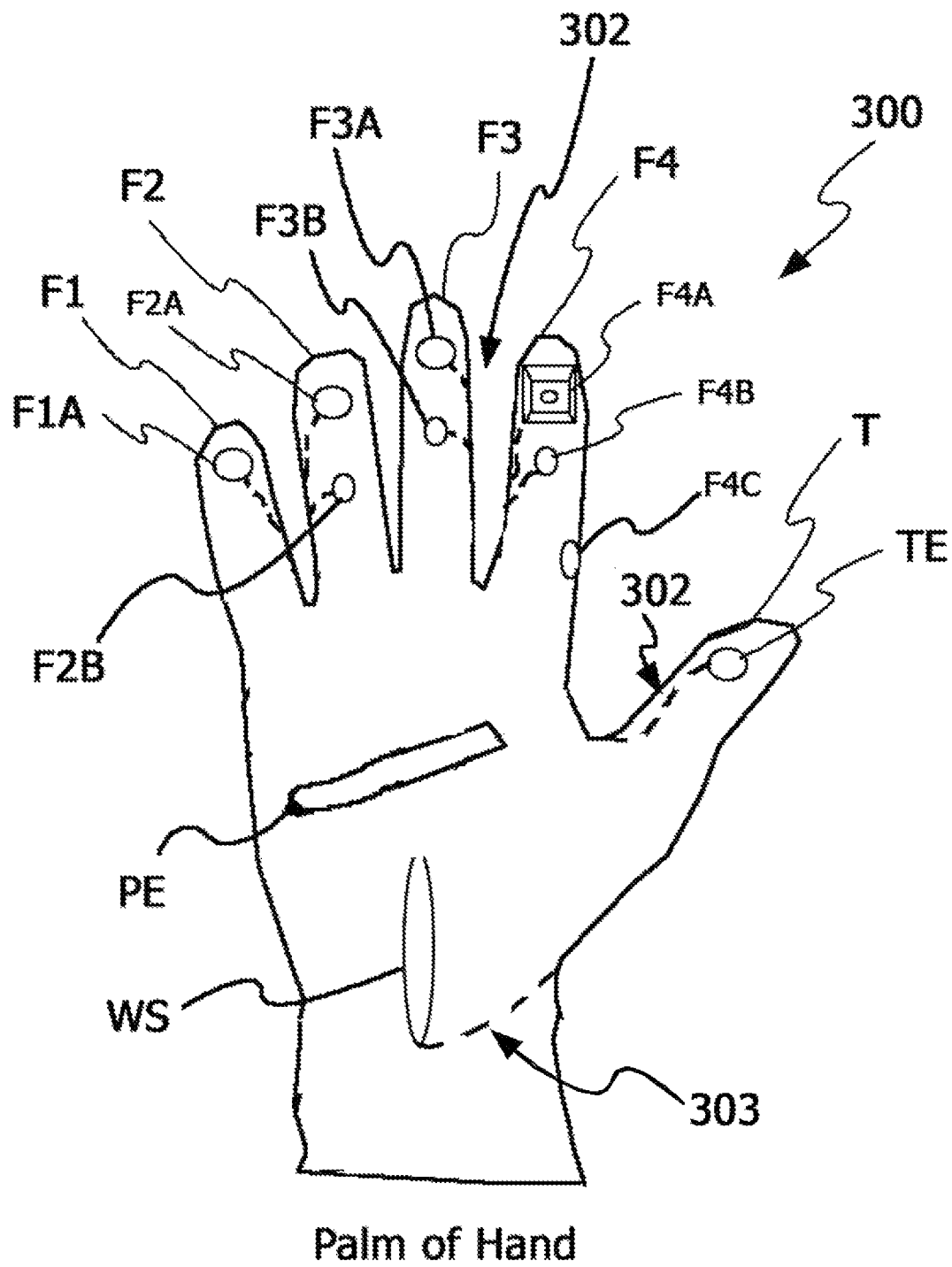
FIG. 11 is a view of the palm side of one exemplary embodiment of a universal wireless glove controller.
Figure 12:
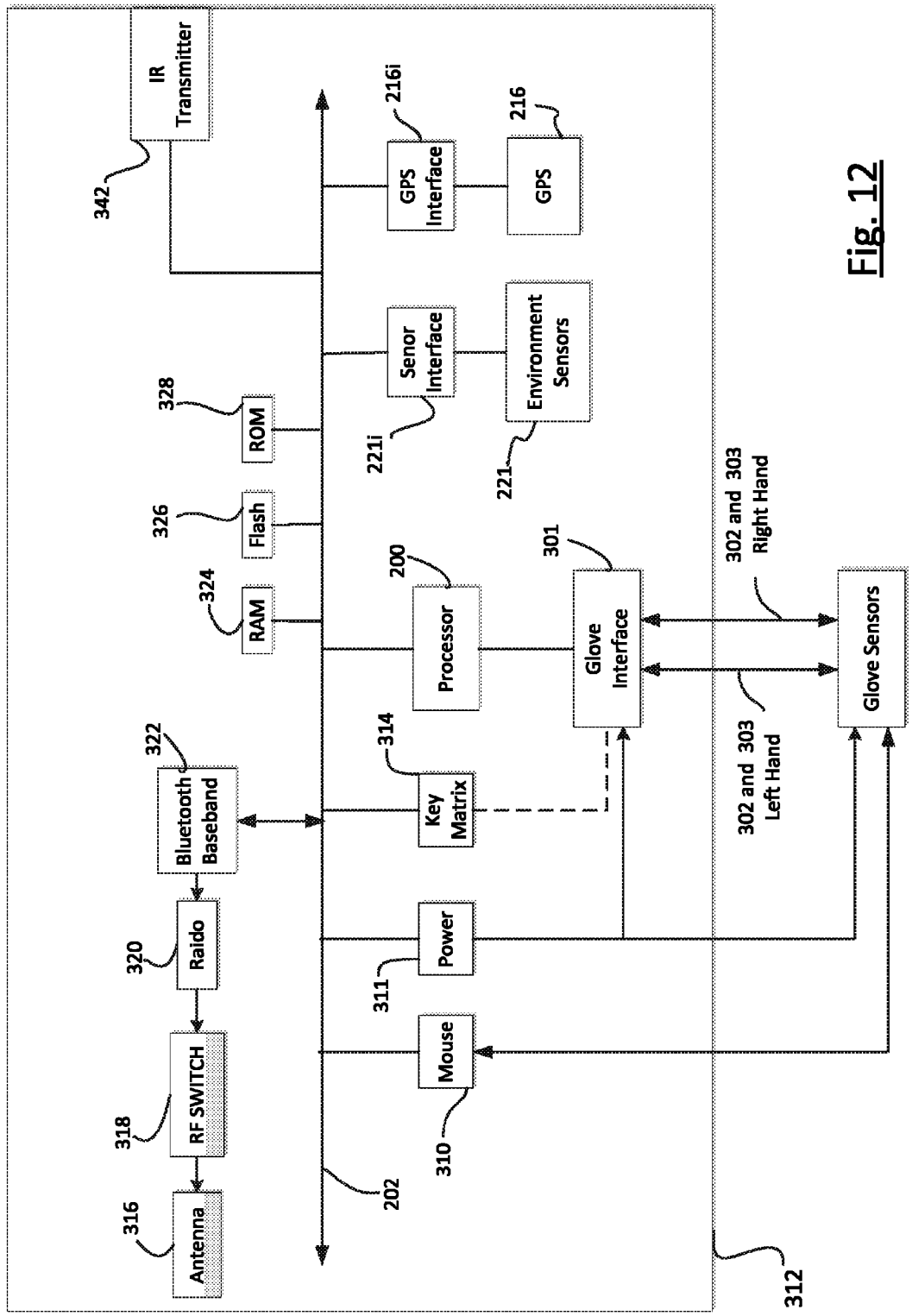
FIG. 12 is a block diagram representation of one exemplary control module for the universal wireless glove controller.

Referring now to FIG. 10, FIG. 11, and FIG. 12, a universal wireless controller is presented comprising a structure configured for being associated with a user's hand, said structure defining a backhand side, a palm side, a plurality of fingers, and a thumb wherein said structure defines the general shape of a human hand. Such controller provides extended features that define a more versatile user interface. At least one finger-element is associated with a finger on the palm side of said structure and at least one stretch-sensor is associated a finger on the backhand side of said structure. Additionally, a plurality of knuckle-switches are associated with the backhand side of said glove structure wherein said knuckle-switches are electrically associated with said processor. Such knuckle-switches, finger-elements, and stretch-sensors are configured to generate trigger-event-data when activated.

As will be defined in detail below, such trigger-event-data signals are transmitted to a control module comprising a processor electrically associated with a memory and a transmitter. The processor is configured to receive trigger-event-data and use a configuration table (defined later) stored in said memory to generate a controller-signal for a given trigger-event.

As shown in FIG. 10 and FIG. 11, a Universal Wireless Glove Interface (UWGI) (300) defines a pair of gloves with each glove containing a set of switches and/or sensors electrically associated with electronic module (312). Electronic module (312) may have a similar electrical design to module (112) including a display, however, for the electronic module (312) embodiment considered below there is no display. The UWGI (300) glove structure defines a backhand surface (see FIG. 10), a palm surface (see FIG. 11), fingers F1 through F4, and thumb T. While FIG. 10 and FIG. 11 relate to a right-hand glove, it will be further appreciated that a left-hand glove would have substantially similar features and the discussions/disclosures relating to the right-hand glove relate equally to a left-hand glove.

As depicted in FIG. 10, associated with the backhand surface of UWGI (300), in the vicinity of the knuckle area of the glove, is a plurality of knuckle-switches (K1, K2, K3, and K4). For the preferred embodiment, such knuckle-switches (K1, K2, K3, and K4) define mechanical pressure sensitive switches. Alternative embodiments include one or more of such mechanical pressure sensitive switches replaced by electromagnetic sensing technology including reed switches, Hall Effect devices, and Weygand wires. Mechanical pressure sensitive switches are actuated by applying pressure to such switches whereas electromagnetic switches are actuated by bringing a magnetic field within the facility of the switch so that a predefined amount of magnetic field lines are impinging the surface of the electromagnetic sensing technology to signal a change of state for such switch. Notably magnetic fields can be generated by electromagnets or permanent magnets. Miniature Electromagnetic sensing technologies and pressure sensitive devices are well known in the art and a detailed description thereof is not necessary to provide an enabling description of the present invention.

Similarly, associated with the backhand surface of UWGI (300), along the finger areas of the UWG (300), is a plurality of stretch sensors (F1S, F2S, F3S, and F4S). The Stretch Sensor is a component that changes resistance when stretched thereby generating trigger-event-data. When relaxed the sensor material has a first resistance value (such as 1K Ohm) and as the stretch sensor is stretched the resistance gradually increases to a final maximum resistance (such as 10 k Ohm). One suitable stretch sensor is a Bi-Directional Flexible Bend Sensor, model FLX-01-L, manufactured by Images Scientific.

The knuckle-switches (K1, K2, K3, and K4) and stretched sensors (FIS, F2S, F3S, and F4S) are electrically associated with electronic module (312) through data links (303) which may define one or more conductive paths. Such conductive paths may be integrated into the glove (300) structure or run along the outside of the glove (300).

As depicted in FIG. 11, associated with the Palm surface of UWGI (300), is a plurality of finger-elements (F1A, F2A, F2B, F3A, F3B, F4B, F4C). For the current embodiment, finger-element (F4A) is an optical sensor. The thumb, T, is associated with a thumb-element (TE) while the palm is associated with a palm-element (PE) and the wrist is associated with stretch sensor (WS). For the preferred embodiment, both thumb-element (TE) and palm-element (PE) are components that generate a magnetic field and such components are permanent magnets (such as rare earth magnets). The plurality of finger-elements (F1A, F2A, F2B, F3A, F3B, F4B, and F4C) is electrically associated with electronic module (312) through data links (302) which may define one or more conductive paths. Where thumb-element (TE) and palm-element (PE) are electromagnets, one or more data links (302) provide a power connection to such elements.

Except for finger-element (F4A), the palm finger-elements are preferably electromagnetic switches configured to detect magnetic fields and thumb-element (TE) is a magnetic field generator. Suitable electromagnetic field sensing technology including reed switches, Hall Effect devices, and Weygand wires. For the preferred embodiment, finger-element (F4A) defines a Programmable Linear Hall Effect Sensor ICs with Analog Output such as the one manufactured by Allegro®. Such finger-elements are capable of sensing displacement, and angular position.

Where finger-elements (F1A, F2A, F2B, F3A, F3B, F4B, and F4C) are simple mechanical pressure sensitive switches, they are actuated by applying pressure to such switches thereby generating trigger-event-data. For the embodiments where finger-elements (F1A, F2A, F2B, F3A, F3B, F4B, and F4C) are electromagnetic field sensors and thumb-element (TE) and palm-element (PE) generate a magnetic field, the finger-elements are energized (or activated) by finger and/or thumb motion where the finger-element is brought into close proximity with either the thumb-element (TE) or the palm-element (PE) thereby generating trigger-event-data.

Finger-element (F4A) is preferably a miniature optical mouse sensor associated with an LED (light emitting diode) such as the one manufactured by Agilent. For such configuration, finger-element (F4A) is placed adjacent to a surface and moved along such surface. For one configuration, the optical navigation data is obtained by acquiring sequential surface images at a rate of up to 2300 times per second. Such data is used to mathematically determine the direction and magnitude of movement of the sensor.

Referring now to FIG. 13 and FIG. 16, exemplary glove tables for defining glove actions are presented. Preferably a plurality of glove tables is stored in a memory within electronic module (312) where each table associates (or maps) the finger movement or switch state with an action to be performed by some electronic device in wireless communication with electronic module (312). While such glove tables could be configured for controlling any type of electronic device, the glove table now being considered relate to keyboard, mouse, hand and finger movement functions for controlling various devices.

Referring to FIGS. 13 and 14, exemplary glove-configuration-tables (350 and 360) for configuring one UWGI (300) system to control at least one computing device, video system, Lights, and powered riding apparatus are presented. Such computing devices include a computer, a PDA, and a cellular telephone. Such powered riding apparatus include a powered surfboard and a powered land board. The video systems include televisions and the lighting systems include lights controlled by an electronic module such as the ones typically used in security systems.

For one embodiment, the glove-configuration-table contains a trigger event (352) parameter, program function (354) parameter, and an emulation ID (356) parameter. A corresponding signal format table is also stored in memory where such signal format table contains the signal protocol and format information for the devices to be controlled. Such signal format tables are likely unique for each electronic device and examples are not supplied in this document and are not needed to enable one of ordinary skill in the art to understand and use the invention. For example, where the remote device to be controlled is a television set with an InfraRed (IR) communication feature, the signal format table would contain the appropriated IR signal command parameters.

While table (350) contains default values for the emulation ID selected, preferably, electronic module (312) is configured to allow a user to program, and save, and thereby customize parameter values for controlling any type of electronic device associated with a compatible controller such as controller (34) or some other computing device configured to receive transmissions from electronic module (312). Additionally, such programmability allows a user to set up a universal wireless glove (300) as he desires.

For the configuration table (350), UWGI (300) is configured to transmit a control signal and communicate with: (a) a computing device with ID 0001; (b) a television with ID 0020; (c) security system with ID 0100; and (d) a powered apparatus with ID 1000. As will be described later, processor (200) of electronic module (312) uses the ID to look up the communication protocols and signal configurations for the desired command signal so that a properly formatted command signal or communication signal is transmitted to the appropriate remote device.

As noted in line one of table (350), when electronic module (312) determines that knuckle-switch (K1) on the left-hand is actuated, electronic module (312) generates the appropriate control signal associated with such trigger event. For the table (350) configuration, the channel on a TV (ID 0020) is incremented by 1 unit. Similarly, when knuckle-switch (K4) on the left-hand is actuated, electronic module (312) generates the appropriate control signal associated with such trigger event which is to cycle the lights associated with a security system (ID 0100).

Where a trigger event has not been defined, as indicated in line 6 of Table 350, for the preferred embodiment, such trigger event is transmitted to the appropriate device and such device determines the meaning (if any) of such trigger event. Further, for some devices, UWGI (300) simply transmits the trigger event ID and the remote device determines the meaning of such trigger event.

For example, as depicted in line 7, when a user wishes to type the character "A", the user moves his thumb on his left hand so that thumb-element (TE) touches finger-element F2A once. Such is signified by string "TA-F2A-1×" where "TA" is thumb-element (TE); "F2A" is finger element F2A; and "1×" means one tap. Similarly, the string "TA-F2A-2×" indicates that a user must move his thumb on his left hand so that thumb-element (TE) touches finger-element F2A twice to generate a character "B". The delay between "taps" is preferably user programmable. Similarly, to generate an "Enter" signal, a user moves the thumb on his left hand so that thumb element (TE) touches finger element (F4A).

Such configuration is simply one possible conversion scheme for associating hand movements to actions to be performed by an electronic device. It will be appreciated by one of ordinary skill in the art that many table configurations and associated schemes may be used without departing from the scope and spirit of the present invention.

Mouse (or any suitable "pointer" device) movement is accomplished by associating the optical sensor (F4A) on the right-hand of universal glove (300) with a surface and moving the optical sensor in a desired direction. Such surface may be the thumb on the right hand or a table top or any suitable surface.

Table 360 presents the hand/finger motions required to generate motion commands or signals. The value "---" indicates such motion has not been defined. For table 360, curling a finger or a thumb causes an electrical change in one of the associated stretch sensors (TS, F1S, F2S, F3S, and F4S). Electronic module (312) uses the EMUL ID to look up the appropriate command format, and were appropriate a signal format in the signal table, and a control or communication signal is transmitted to a remote electronic device. For example, moving the ring finger on the left-hand, so that the ring finger-element (F2A) touches palm-element (PE), would generate a ring finger curl motion signal and the ring finger-element activation signal that would notify processor (200) that the index finger was curled all the way to the palm. Process (200) would look up the appropriate command to issue and determine that a "volume up" command was needed, the type of signal required is an infrared remote control signal for TV ID 0020, and activate IR Transmitter (342) and transmit the appropriate command. For the configuration in table 360, the volume of a TV (ID 0020) would increase.

One of ordinary skill in the art will appreciate that a remote electronic device, such as a computer, can use the hand signals generated by universal wireless glove (300) as an User I/O device instead of the traditional keyboard and mouse and would be particularly useful in the virtual environment of virtual reality goggles where a construct of the users hands are projected within the virtual reality environment created by the goggles.

Referring now to FIG. 12, a block diagram of one exemplary the universal wireless interface (300) electronic module (312) is presented. As depicted in FIG. 12, processor (200) is electrically associated with the various components of the electronic module via communication bus (202). Preferably, electronic module (312) includes RAM memory (324), flash memory (326), and ROM memory (328) a first transmitter and a second transmitter. Such memory can be used for storing glove configuration tables, signal format tables, and other data needed to operate the universal wireless controller (300). The first transmitter is a Bluetooth transmitter (322) and the second transmitter is an infrared transmitter (342). It will be appreciated than any type of transmitter technology may be used.

The glove sensors (i.e. finger-elements, thumb-elements, optical sensors, etc.) are electrically associated with electronic module (312) through communication data links (303) and (302). For one embodiment, such data links connect to various hand signals to a glove interface (201). Glove interface (201) is configured to power the glove sensor as needed and determine when a trigger event has occurred or is occurring and transfers a digital or analog representation of the generated hand signal to processor (200). For one embodiment, key matrix (314) may be associated directly with data links (303) and (302). Power (311) is electrically associated with the glove sensors as needed. For example power (311) may supply power to the light source associated with the optical mouse sensor as well as the electromagnetic sensors. Further, the optical mouse sensor data links are electrically associated with mouse controller (310). IR transmitter (342) is used to generate control signals for devices such as televisions thereby performing the functions normally performed by the television's remote control (such as changing channels and increasing volume). GPS (216) is used as described above to generate location data for the electronic module (312). Similarly, the environmental sensors (221) can be any of the previously defined sensors for monitoring some parameter and generating data associated with such parameter. Where the environmental sensor (221) is an accelerometer, controller (200) transfers such acceleration data along with the finger and hand movement data to a remote electronic device so that not only can finger movement be modeled in a virtual environment so can the movement of the associated hand and arm.

One of ordinary skill in the art will appreciate that by programming electronic module (312) with the appropriate glove-configuration-table, any electronic device can be controlled remotely using hand and finger motion and the same universal glove controller system can be used to control a plurality of functions. For example, with the appropriate glove-configuration-table and signal format tables (as needed) programmed into electronic module (312), a user can control the functions of his computer, the lighting in his room, the channel and associated volume of a program being viewed on a television via simple hand and finger movements using the same universal wireless glove (300).

One of ordinary skill in the art will appreciate that the above universal Bluetooth Glove controller can be used to control any appropriately configured electronic device. With regard to computers, the configuration tables can define thumb and finger movements that perform any one of a plurality of functions such as scrolling, opening files, saving files, typing, surfing the Internet. Glove embodiments comprising audio features can be used with speech recombination software to add almost unlimited system control. The universal wireless glove controller can be used to control wheelchairs, to perform micro surgery using a computer interface, to create works of art and control/play musical instruments and associated recording devices as well as control a light show designed for a musical performance.

While the present subject matter has been described in detail with respect to specific embodiments thereof, it will be appreciated that those skilled in the art, upon attaining an understanding of the foregoing may readily adapt the present technology for alterations to, variations of, and equivalents to such embodiments. Accordingly, the scope of the present disclosure is by way of example rather than by way of limitation, and the subject disclosure does not preclude inclusion of such modifications, variations, and/or additions to the present subject matter as would be readily apparent to one of ordinary skill in the art.

What is claimed is:

1. A universal wireless controller for controlling a plurality of electronic devices, said universal controller comprising:
   a structure configured for being associated with a user's hand, said structure defining a backhand side, a palm side, a plurality of fingers, and a thumb wherein said structure defines the general shape of a human hand;
   at least one finger-element associated with a finger on the palm side of said structure, said finger-element configured to generate trigger-event-data when activated;
   at least one stretch-sensor associated with a finger on the backhand side of said structure, said stretch-sensor configured to generate trigger-event-data when said stretch-sensor is stretched;
   a control module comprising a processor electrically associated with a memory and a transmitter, said processor further electrically associated with said at least one finger-element and said at least one stretch-sensor;
   a power source electrically associated with at least said processor, said memory and said transmitter;
   wherein said processor is configured to receive trigger-event-data;
   at least one configuration table stored in said memory wherein said configuration table defines the controller-signal to be generated for a given trigger-event; and
   wherein said processor is further configured to use said trigger-event-data and said configuration table to generate a controller-signal and use said transmitter to transmit said controller-signal.

2. A universal wireless controller as in claim 1, wherein said structure defines a glove and wherein said configuration table is user programmable.

3. A universal wireless controller as in claim 2, further comprising at least one finger-element associated with each finger on the palm side of said glove.

4. A universal wireless controller as in claim 3, further comprising at least one stretch-sensor associated with each finger on the backhand side of said glove.

5. A universal wireless controller as in claim 4, further comprising a plurality of knuckle-switches associated with the backhand side of said glove wherein said knuckle-switches are electrically associated with said processor.

6. A universal wireless controller as in claim 5, further comprising at least one optical sensor associated with a finger on the palm side of said glove wherein said optical sensor is electrically associated with at least one of (a) said processor and (b) a mouse controller disposed in said control module and electrically associated with said processor.

7. A universal wireless controller as in claim 5, further comprising at least one thumb-element associated with said thumb on the palm side of said glove, and wherein said finger-elements are activated when at least one of (a) said finger-elements are brought into close proximity of said thumb-element and (b) said finger-elements are pressed.

8. A universal wireless controller as in claim 7, further comprising at least one palm-element associated with the palm area on the palm side of said glove, and wherein said finger-elements are activated when at least one of (a) said finger-elements is brought into close proximity of said palm-element and (b) said finger-elements are pressed against said palm-element.

9. A universal wireless controller as in claim 8, wherein said finger-elements are electromagnetic field sensors and said thumb-element and said palm-element generate a magnetic field.

10. A universal wireless controller as in claim 9, wherein said electromagnetic field sensors are Hall Effect devices and said thumb-element is a magnet.

11. A universal wireless controller as in claim 8, further comprising a second transmitter electrically associated with said processor and configured for transmitting a second controller-signal and wherein said processor is further configured to use said trigger-event-data and said configuration table to generate a second controller-signal and use said second transmitter to transmit said second controller-signal.

12. A universal wireless controller as in claim 11, wherein said second transmitter is one of (a) infrared (IR) transmitter, (b) a ultrasonic transmitter; and (c) a radiofrequency transmitter.

13. A universal wireless controller as in claim 1, further comprising an accelerometer electrically associated with said processor wherein said accelerometer is configured to generate motion-data and wherein said processor is configured to use said motion-data to generate said controller-signal.

14. A universal wireless controller for controlling a plurality of electronic devices, said universal controller suitably sized to be associated with an user's body, said controller comprising:
   a structure configured for being associated with a user's hand, said structure defining a backhand side, a palm side, and a plurality of fingers;
   at least one finger-element associated with each of at least two fingers on the palm side of said structure, said finger-element configured to generate trigger-event-data when activated and wherein a said finger-element is activated when at least one of (a) a said finger-element is brought into close proximity of a magnetic field and (b) a said finger-element is pressed;
   at least one stretch-sensor associated with at least one finger on the backhand side of said structure, said stretch-sensor configured to generate trigger-event-data when said stretch-sensor is stretched;
   a control module comprising a processor electrically associated with a memory and a transmitter, said processor further electrically associated with said at least one finger-element and said at least one stretch-sensor;
   a power source electrically associated with at least said processor, said memory and said transmitter;
   wherein said processor is configured to receive trigger-event-data;
   a configuration table stored in said memory wherein said configuration table defines the controller-signal to be generated for a given trigger-event for at least two different electronic devices; and
   wherein said processor is further configured to use said trigger-event-data and said configuration table to generate a controller-signal and use said transmitter to transmit said controller-signal.

15. A universal wireless controller as in claim 14, wherein said structure further defines a thumb comprising at least one thumb-element associated with the palm side of said thumb and wherein each finger is associated with at least one finger-element and wherein said configuration table is programmable.

16. A universal wireless controller as in claim 15, further comprising a plurality of knuckle-switches associated with the backhand side of said glove wherein said knuckle-switches are electrically associated with said processor and wherein said thumb-element generates a magnetic field.

17. A universal wireless controller as in claim 15, wherein said structure defines a glove and further comprising at least one optical sensor associated with a finger on the palm side of said glove wherein said optical sensor is electrically associated with at least one of (a) said processor and (b) a mouse controller disposed in said control module and electrically associated with said processor and wherein said thumb-element generates a magnetic field.

18. A universal wireless controller as in claim 17, further comprising a second transmitter configured for transmitting a controller-signal and wherein said configuration table defines which transmitter to be used to transmit a control signal and wherein said processor is further configured to use said trigger-event-data and said configuration table to generate a controller-signal and use said second transmitter to transmit said controller-signal.

19. A universal wireless glove controller for controlling a plurality of electronic devices, said universal glove controller comprising:
- a glove structure configured for being associated with a user's hand, said glove structure defining a backhand side, a palm side, a plurality of fingers, and a thumb wherein said glove structure defines the general shape of a human hand;
- at least one thumb-element associated with said thumb on the palm side of said glove structure;
- at least one finger-element associated with each finger on the palm side of said glove structure, said at least one finger-element configured to generate trigger-event-data when activated and wherein a said at least one finger-element is activated when at least one of (a) a said at least one finger-element is brought into close proximity of said thumb-element and (b) a said at least one finger-element is pressed against a surface;
- at least one stretch-sensor associated with each finger on the backhand side of said glove structure, said stretch-sensor configured to generate trigger-event-data when said stretch-sensor is stretched;
- a control module comprising a processor electrically associated with a memory and a transmitter, said processor further electrically associated at least one of said finger-elements and at least one of said stretch-sensors;
- a power source electrically associated with at least said processor, said memory and said transmitter;
- wherein said processor is configured to receive trigger-event-data;
- at least one user programmable configuration table stored in said memory wherein said at least one user programmable configuration table defines the controller-signal to be generated for a given trigger-event for a plurality of devices; and
- wherein said processor is further configured to use said trigger-event-data and at least one user programmable configuration table to generate a controller-signal for a first electronic device and use said transmitter to transmit said controller-signal.

20. A universal wireless controller as in claim 19, further comprising a second transmitter configured for transmitting a second controller-signal and wherein said processor is further configured to use said trigger-event-data and said at least one user programmable configuration table to generate a second controller-signal configured for a second electronic device and wherein said processor is further configured to use said second transmitter to transmit said second controller-signal.

* * * * *